(12) United States Patent
Kim et al.

(10) Patent No.: US 8,312,134 B2
(45) Date of Patent: Nov. 13, 2012

(54) REPORTING LINK LAYER STATUS INFORMATION USING HETEROGENEOUS NETWORK HANDOVER MODULE IN MOBILE COMMUNICATION SYSTEM

(75) Inventors: Yong Ho Kim, Bucheon (KR); Jin Lee, Seoul (KR); Yong Won Kwak, Anyang (KR)

(73) Assignee: LG Electronics Inc., Seoul (KR)

( * ) Notice: Subject to any disclaimer, the term of this patent is extended or adjusted under 35 U.S.C. 154(b) by 686 days.

(21) Appl. No.: 11/438,055

(22) Filed: May 18, 2006

(65) Prior Publication Data
US 2006/0277298 A1 Dec. 7, 2006

(30) Foreign Application Priority Data
May 18, 2005 (KR) .................. 10-2005-0041659

(51) Int. Cl.
G06F 15/173 (2006.01)
G01R 31/08 (2006.01)
H04W 4/00 (2009.01)
H04W 36/00 (2009.01)
H04L 12/28 (2006.01)

(52) U.S. Cl. ........ 709/224; 370/230; 370/329; 370/392; 455/436; 455/442

(58) Field of Classification Search .................. 709/224; 455/439, 436, 442; 370/230, 329, 392
See application file for complete search history.

(56) References Cited

U.S. PATENT DOCUMENTS

| 2002/0072363 | A1* | 6/2002 | Riihinen et al. | 455/432 |
|---|---|---|---|---|
| 2002/0160785 | A1* | 10/2002 | Ovesjo et al. | 455/453 |
| 2005/0041581 | A1* | 2/2005 | Kuusinen et al. | 370/230 |
| 2005/0070288 | A1* | 3/2005 | Belkin et al. | 455/439 |
| 2006/0002342 | A1* | 1/2006 | Lin | 370/331 |
| 2006/0056349 | A1* | 3/2006 | Nakatugawa et al. | 370/331 |
| 2006/0058032 | A1* | 3/2006 | Pearce et al. | 455/444 |
| 2006/0058038 | A1* | 3/2006 | Das et al. | 455/456.1 |
| 2006/0083199 | A1* | 4/2006 | Yang | 370/331 |
| 2006/0209757 | A1* | 9/2006 | Hsu | 370/331 |
| 2007/0263628 | A1* | 11/2007 | Axelsson et al. | 370/392 |
| 2008/0192668 | A1* | 8/2008 | Okubo et al. | 370/312 |

OTHER PUBLICATIONS

Gupta, V. et al.: "Media Independent Handover", IEEE 802.21 Working Group [online], May 3, 2005.*

(Continued)

*Primary Examiner* — Boris Gorney
(74) *Attorney, Agent, or Firm* — Lee, Hong, Degerman, Kang & Waimey

(57) ABSTRACT

The present invention relates to link layer status information using a media independent handover module in a mobile communication system, wherein packet loss attributed to congestion can be identified from packet loss attributed to non-congestion. Preferably, the present invention comprises establishing communication between a mobile terminal and at least one of a homogeneous and heterogeneous network, reporting status information of a radio link connecting the mobile terminal and the at least one of a homogeneous and heterogeneous network to a heterogeneous network handover module of the mobile terminal, and reporting the status information of the radio link from the heterogeneous network handover module to an upper management entity of the mobile terminal if the heterogeneous network handover module determines a predetermined condition is satisfied.

1 Claim, 24 Drawing Sheets

OTHER PUBLICATIONS

Gupta, V. et al.: "Media Independent Handover", IEEE 802.21 Working Group [online], May 3, 2005 [retrieved on Nov. 6, 2007]. Retrieved from the Internet: URL:http://www.ieee802.org/21/doctree/2005_Meeting_Docs/2005-05_meeting_docs/21-05-0240-01-0000-Joint_Harmonized_MIH_Proposal_Draft_Text.doc, XP002428336. figures 1, 2, 8, 8, 10-19: sections 6.3.2, 6.4.3, 6.4.12, 7.1.2, 7.3.2, 7.4.1, 8.3, 8.6.

Mitani, K. et al.: "Unified L2 Abstractions for L3-Driven Fast Handover", IEEE 802.21 Working Group [online], Mar. 15, 2005 [retrieved on Nov. 6, 2007]. Retrieved from the Internet: <URL: http://www.ieee802.org/21/doctree/2005_Meeting_Docs/2005-03_meeting_docs/21-05-0246-00-0000-12abst_pub.pdf>. pp. 1-24.

Gupta, V, et al.: "A Generalized Model for Link layer Triggers", IEEE 802.21 Working Group [online], Mar. 1, 2004 [retrieved on Nov. 6, 2007]. Retrieved from the Internet: <URL: http://www.ieee802.org/21/doctree/2004_Meeting_Docs/2004-03_meeting_docs/Generalized_triggers-02.pdf>, XP002344485. pp. 2-10.

Aboba, B.: "Architectural Implications of Link Indications; draftiab-link-indications-01.txt", Network Working Group, Internet Architecture Board, IAB, Jan. 10, 2005, XP015014806. sections 1.3-2.1.

IEEE Standards Committee, "Draft IEEE Standard for Local and Metropolitan Area Networks: Media Independent Handover Services," IEEE P802.21/D01.00, Mar. 2006, XP-002459799.

Gupta, V., et al.; "Media Independent Handover"; IEEE 802.21 Media Independent Handover Services; May 2, 2005.

* cited by examiner

FIG. 10
Prior Art

| Octet 1 | Octet 2 | Octet 3 | Octet 4 |
|---|---|---|---|
| Message Type | Length | Sequence Number | M F Reserved |
| Fragmentation offset | XID (Packet ID) | Source Hardware type / Destination Hardware type | Reserved |
| Source Hardware Address ||||
| Source IP Address ||||
| Destination Hardware Address ||||
| Destination IP Address ||||
| MIH Message ||||

# REPORTING LINK LAYER STATUS INFORMATION USING HETEROGENEOUS NETWORK HANDOVER MODULE IN MOBILE COMMUNICATION SYSTEM

CROSS-REFERENCE TO RELATED APPLICATIONS

Pursuant to 35 U.S.C. §119(a), this application claims the benefit of earlier filing date and right of priority to Korean Application No. P2005-0041659, filed on May 18, 2005, the content of which is hereby incorporated by reference herein in its entirety.

FIELD OF THE INVENTION

The present invention relates to reporting link layer status information using a heterogeneous network handover module in a mobile communication system. Although the present invention is suitable for a wide scope of applications, it is particularly suitable for identifying packet loss attributed to congestion from packet loss attributed to non-congestion.

BACKGROUND OF THE INVENTION

A heterogeneous network media independent handover (MIH) technology according to a related art is explained as follows. An object of IEEE 802.21 is for the international standardization of inter-heterogeneous-network media independent handover. Inter-heterogeneous-network media independent handover aims to enhance a user's convenience when using mobile terminal devices by providing seamless handover and service continuity between heterogeneous networks. An MIH function, an event trigger and an information service (IS) are defined as basic requirements for the technology.

A mobile terminal is a multi-node that supports at least one interface type. For example, various interface types supported are a wire-line interface type, such as an IEEE 802.3-based Ethernet, a wireless interface type, such as an IEEE 802.11, IEEE 802.15 and IEEE 802.16 interface, and an interface defined by a cellular standardization organization, such as 3GPP and 3GPP2.

FIG. 1 is an exemplary diagram of a mobile terminal supporting a media independent handover (MIH) function. Referring to FIG. 1, a mobile terminal supporting a media independent handover function can have the media independent handover function provided within a protocol structure to enhance performance while performing handover. For example, a service delay, user's sensory index, and the like may be improved. A possible configuration of the MIH function is shown in FIG. 1. The MIH function is not a protocol layer, but a function. A link layer and interface exist below the MIH function. All upper layers and interfaces exist above the MIH function.

Media independent handover (MIH) is defined between IEEE 802-series interfaces, or between an IEEE 802-series interface and a non-IEEE 802-series interface, such as a 3GPP or 3GPP2 interface. A mobility supporting protocol of an upper layer such as a Mobile IP and a session initiation protocol (SIP) is supported for seamless handover service.

A transmission control protocol (TCP) loss recovery mechanism is explained as follows. The TCP loss recovery mechanism attempts to recover a packet loss through retransmission when detecting the packet loss. The TCP loss recovery mechanism includes two elements: 1) Fast Retransmit; and 2) Fast Recovery.

A related art is explained as follows.

Heterogeneous Network Handover

MIH (Media Independent Handover)

An MIH function is placed below an IP layer and facilitates a handover handling process using an input value from Layer 2 such as a trigger event, information for another network and the like. The MIH function can include input values based on user policy and configuration that may affect a handover process.

General interfaces are defined between the MIH function and a Layer 3 entity, such as the Mobile IP and SIP. These interfaces provide information for Layer 1 (physical layer), Layer 2 (medium access control layer) and mobility management. The MIH function also acquires information for lower layers and a network with the help of an event service and an information service. Hence, the MIH function is placed for an upper layer to monitor and control a status of another link within a mobile terminal.

FIG. 2 is a block diagram of functional entities and a transport protocol of a user equipment (UE) or mobile terminal and a network using MIH function technology. Dotted lines indicate primitives, event triggers and the like.

Event Service

For fast handover, a network layer needs to use information from a link layer to reconfigure a connection as soon as possible. A link layer event is helpful for estimating a user's movement and can help a mobile terminal and a network prepare handover in advance.

A trigger for handover can start from a physical layer (PHY) or a medium access control layer (MAC). An origin of this trigger can be a local stack or a remote stack. An event service is classified into an MIH event and a link event. An event within the local stack is a local event. An event service transferred to the remote stack is a remote event.

FIG. 3 is a block diagram of a local event model and an MIH event model. Referring to FIG. 3, an MIH event is an event delivered from the MIH function to an upper management entity or an upper layer and corresponds to an event trigger according to a related art. A link event is an event delivered to the MIH function from a lower layer (MAC or physical layer) and uses primitives used in each interface MAC or physical layer.

FIG. 4 is a block diagram of a remote link event model. Referring to FIG. 4, if an event is triggered from a lower layer within a local stack to an MIH function within the same local stack, the MIH function of the local stack delivers the event to an MIH function of a remote stack. Accordingly, this triggers an event to a remote stack MIH function from a lower layer within the remote stack. From this, a trigger is delivered to the MIH function of the local stack as well.

FIG. 5 is a block diagram of a remote MIH event model. Referring to FIG. 5, an MIH function within a local stack triggers a remote MIH event and then transfers the event to a correspondent MIH function within a remote stack. The correspondent MIH function delivers the event to an upper management entity or an upper layer within its stack. Accordingly, this triggers an event to the local stack MIH function from the MIH function within the remote stack. From this, a trigger is delivered to an upper layer within the local stack as well.

FIG. 6 is a block diagram of an MIH command model and a link command model. Referring to FIG. 6, an MIH command is generated from an upper management entity or an upper layer to be delivered to an MIH function. The MIH command instructs the MIH function to perform a prescribed action. A link command is generated from an MIH function and delivered to a lower layer. The link command instructs the lower layer to perform a prescribed action.

FIG. 7 is a block diagram of a remote MIH command model. Referring to FIG. 7, a remote MIH command is generated from an upper management entity or an upper layer within a local stack and is delivered to an MIH function. The MIH function of the local stack then delivers the command to a correspondent MIH function within a remote stack. Accordingly, this triggers a command to a remote stack MIH function from an upper layer within the remote stack. From this, the command is delivered to the MIH function within the local stack as well.

FIG. 8 is a block diagram of a remote link command model. Referring to FIG. 8, an MIH function within a local stack generates a remote link command and delivers the command to a correspondent MIH function within a remote stack. The correspondent MIH function then delivers the command to a lower layer within the remote stack. Accordingly, this triggers a command to the local stack MIH function from the MIH function within the remote stack. From this, the command is delivered to a lower layer within the local stack as well.

An event trigger provides information related to a status change of a network different from a status of a current signal. The event trigger may also provide information related to an estimated change of the network. Furthermore, the event trigger includes changes on physical and medium access control layers and attribute changes of a specific network.

Event types can be classified as follows: 1) PHY layer event; 2) MAC layer event; 3) Management event; 4) L3 event; and 5) Application event.

A basic trigger event is explained as follows. A Link_Up occurs when a Layer 2 (L2) connection is established on a specific link interface and when Layer 3 (L3) packets can be transferred from a higher layer. In this case, it is decided that all L2 configurations configuring the link are completed. An event origin of the Link_Up is a local MAC and a remote MAC. Parameters of the Link_Up are shown in Table 1.

TABLE 1

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| NetworkIdentifier | Media Specific | Network Identifier usable in detecting change of subnet |

A Link_Down occurs when an L2 connection is released on a specific interface and when it is no longer able to transfer L3 packets. An event origin of the Link_Down is a MAC. Parameters of the Link_Down are shown in Table 2.

TABLE 2

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| ReasonCode | | Reason why link is released |

A Link_Going_Down occurs when it is estimated that an L2 connection is going to link down within a specific time. Also, the Link_Going_Down may be a signal for initializing a handover procedure. An event origin of the Link_Going_Down is a local MAC and a remote MAC. Parameters of the Link_Going_Down are shown in Table 3.

TABLE 3

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Down |
| ConfidenceLevel | % | Estimated level for Link_Down of link in a specific time |
| UniqueEventIdentifier | | Used in case that Event rollback occurs |

A Link_Going_Up occurs when it is estimated that an L2 connection is going to link up within a specific time. Also, the Link_Going_Up is used when a long time is taken for a network to be initialized. An event origin of the Link_Going_Up is a local MAC and a remote MAC. Parameters of the Link_Going_Up are shown in Table 4.

TABLE 4

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |
| TimeInterval | Time in msecs | Estimated time for Link_Up |
| ConfidenceLevel | % | Estimated level for Link_Up of link in a specific time |
| UniqueEventIdentifier | | Used in case that Event rollback occurs |

A Link_Available indicates that a new specific link is usable or available. The Link_Available indicates a possibility that a new base station or point of attachment (POA) can provide a link having a better quality than that of a base station or point of attachment currently accessed by a mobile terminal. An event origin of the Link_Available is a local MAC and a remote MAC. Parameters of the Link_Available are shown in Table 5.

TABLE 5

| Name | Type | Description |
| --- | --- | --- |
| EventSource | EVENT_LAYER_TYPE | Origin from which event is generated |
| EventDestination | EVENT_LAYER_TYPE | Destination to which event shall be delivered |
| MacMobileTerminal | MAC Address | MAC address of MSS |
| MacOldAccessRouter | MAC Address | MAC address of old access router |
| MacNewAccessRouter | MAC Address | MAC address of new access router |

An MIH protocol includes the following steps: 1) MIH Capability Discovery; 2) MIH Registration; and 3) MIH Message Exchange. During MIH Capability Discovery, an MIH of a mobile terminal or an MIH of a base station/access router discovers what type of entity on a network supports an MIH function. During MIH Registration, MIH functions of different entities execute registration procedures with each other to initiate the MIH protocol, respectively. During MIH Message Exchange, after completion of the registration procedures, two MIH functions can transmit/receive MIH messages using MIH payloads and the MIH protocol.

FIG. 9 is a block diagram of a relationship between an MIH function (MIHF) and another protocol layer within a stack. Referring to FIG. 9, when transmitting an MIH message to a remote MIHF from an MIHF within the stack, the MIH message can be transmitted using a link layer. The MIHF message can also be transmitted as an IP packet using an IP layer.

MIH Packet Format

FIG. 10 is a diagram of an MIH packet message format. Referring, to FIG. 10, an MIH Message Type (1-octet) is classified according to Table 6.

TABLE 6

| MIH Message Type | MIH Message Name | MIH Message Type |
| --- | --- | --- |
| 1 | MIH_Capability_Discover.request | Capability Discovery |
| 2 | MIH_Capability_Discover.response | Capability Discovery |
| 3 | MIH_Capability_Discover.advertisement | Capability Discovery |
| 4 | MIH_Registration.request | Registration |
| 5 | MIH_Registration.response | Registration |
| 6 | MIH_Deregistration.request | Registration |
| 7 | MIH_Deregistration.confirm | Registration |
| 8 | MIH_Event_Register.request | Registration |
| 9 | MIH_Event_Register.confirm | Registration |
| 10 | MIH_Event_Deregister.request | Registration |
| 11 | MIH_Event_Deregister.confirm | Registration |
| 12 | MIH_Link_Up.indication | Event Service |
| 13 | MIH_Link_Down.indication | Event Service |
| 14 | MIH_Link_Going_Down.indication | Event Service |
| 15 | MIH_Link_Event_Rollback.indication | Event Service |
| 16 | MIH_Link_Parameters_Change.indication | Event Service |
| 17 | MIH_Link_Event_Discover.request | Command Service |
| 18 | MIH_Link_Event_Discover.confirm | Command Service |
| 19 | MIH_Network_Address_Information.request | Command Service |
| 20 | MIH_Network_Address_Information.response | Command Service |
| 21 | MIH_Handover_Pre-notification.request | Command Service |
| 22 | MIH_Handover_Pre-notification.response | Command Service |
| ... | ... | ... |
| 23+ | Reserved | Reserved |

Still referring to FIG. 10, Length (1-octet) indicates a total length of an overall header including an MIH message. Sequence Number (1-octet) is a total count of message transmissions. IP (1-bit) indicates whether an IP address included in a header is of an IPv4 or IPv6 protocol (e.g., 0: IPv4, 1: IPv6). F (1-bit) indicates whether a message is fragmented or not (e.g., 0: No Fragmentation, 1: Fragmentation).

With regard to Fragmentation Offset (1-octet), fragmentation indicates how many packets are left to configure a complete message in case that a message is incomplete with one packet. XID (Packet ID) (1-octet) is used in matching each request message and confirm message. Source Hardware Type (4-bit) indicates a hardware type of a party that transmits a corresponding message (e.g., 0000: IEEE 802.3 interface, 0001: IEEE 802.11 interface, 0010: IEEE 802.16 interface, 0011: 3GPP interface, 0100: 3GPP2 interface, 0101~11111: Reserved). Destination Hardware Type (4-bit) indicates a hardware type of a party that receives a corresponding message (e.g., 0000: IEEE 802.3 interface, 0001: IEEE 802.11 interface, 0010: IEEE 802.16 interface, 0011: 3GPP interface, 0100: 3GPP2 interface, 0101~11111: Reserved).

Source Hardware Address indicating a hardware address of a party that transmits a corresponding message (e.g., Layer 2 address). Destination Hardware Address indicates a hardware address of a party that receives a corresponding message (e.g., Layer 2 address). Destination IP Address indicates an IP address of a party that receives a corresponding message. MIH Message is a field where a substantial message of a remote event registration, event service and command service is included in a TLV (type, length and value) format.

Inter-MIH Signaling Message

An inter-MIH signaling message can be classified into: 1) MIH Capability Discovery; 2) Remote MIH Event Registration; and 3) Remote MIH Event Service and Remote MIH Command Service.

(1) MIH Capability Discovery Associated Message

An MIH_Capability_Discovery.request message does not include an MIH message payload, but is transmitted in a manner of setting a message type to 1 with an MIH header only. This message can be delivered via Layer 2 or 3. If an entity transmitting this message does not know an exact address of a correspondent entity and attempts to discover an entity having an MIH function within a network, this message is transmitted as a broadcast message. If an entity transmitting this message knows an address of a correspondent entity and attempts to know a presence or non-presence of an MIH function of the correspondent entity, this message transmitted as a unicast message.

An entity having received the MIH_Capability_Discovery.request message responds with an MIH_Capability_Discovery.response message if the entity has an MIH function. This message does not include an MIH message payload but is transmitted in a manner of setting a message type to 1 with an MIH header only. This message can be delivered via Layer 2 or 3. In this case, a destination address field is filled in the MIH header by copying a source address of the MIH_Capability_Discovery.request message. A source address field is filled in the MIH header with the entity's address. Moreover, an entity having an MIH function can periodically advertise its MIH function via Layer 2 or 3.

(2) MIH Registration Associated Message

An MIH_Event_Registration.request message is used by an MIH function attempting to register a specific event service to be delivered to a remote stack.

TABLE 7

| Name | Type (1 byte) | Length | Value |
|---|---|---|---|
| RequestedEventList | | 1 | If an area of each bit is set to 1, it means that a request is made to have a corresponding service registered.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>6~7: Reserved |

An MIH_Event_Registration.confirm message returns a result of a registration request.

TABLE 8

| Name | Type (1 byte) | Length | Value |
|---|---|---|---|
| ResponseEventList | | 1 | If an area of each bit is set to 1, it means that a corresponding service is successfully registered.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>6~7: Reserved |

An MIH_Event_Deregistration.request message is delivered to deregister an event service having been registered to a remote stack.

TABLE 9

| Name | Type (1 byte) | Length | Value |
|---|---|---|---|
| RequestedEventList | | 1 | If an area of each bit is set to 1, it means that a request is made to have a corresponding service deregistered.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>6~7: Reserved |

An MIH_Event_Deregistration.confirm message returns a result of the MIH_Event_Deregistration.request.

TABLE 10

| Name | Type (1 byte) | Length | Value |
|---|---|---|---|
| ResponseEventList | | 1 | If an area of each bit is set to 1, it means that a corresponding service is successfully deregistered.<br>Bit #0: Link Up<br>Bit #1: Link Down<br>Bit #2: Link Going Down |

TABLE 10-continued

| Name | Type (1 byte) | Length | Value |
|---|---|---|---|
| | | | Bit #3: Link Detected |
| | | | Bit #4: Link Parameters Change |
| | | | Bit #5: Link Event Rollback |
| | | | 6~7: Reserved |

(3) MIH Event Service Associated Message

An MIH_Link_Up.indication message is used by a mobile terminal or a point of attachment to transmit a Link_Up message to a remote stack. The MIH_Link_Up.indication message informs the remote stack that a new link connection is configured. Moreover, this message can be delivered to all entities supporting an MIH function from all entities supporting an MIH function as well as the mobile terminal or the point of attachment.

TABLE 11

| Name | Type (1 byte) | Length | Value |
|---|---|---|---|
| MacMobileTerminal | | Variable | MAC Address |
| MacNewPoA | | Variable | MAC Address of New PoA (AP) |
| MacOldAccessRouter | | Variable | MAC Address of old Access Router (if any) |
| MacNewAccessRouter | | Variable | MAC Address of new Access Router |

An MIH_Link_Down.indication message is used by a mobile terminal or a point of attachment to transmit a Link_Down message to a remote stack. The MIH_Link_Down.indication message informs the remote stack that a new link connection is released. Moreover, this message can be delivered to all entities supporting an MIH function from all entities supporting an MIH function as well as the mobile terminal or the point of attachment.

TABLE 12

| Name | Type (1 byte) | Length | Value |
|---|---|---|---|
| MacMobileTerminal | | Variable | MAC Address |
| MacNewPoA | | Variable | MAC Address of New PoA (AP) |
| MacOldAccessRouter | | Variable | MAC Address of old Access Router (if any) |
| ReasonCode | | 1 | The reason why a link connection is released is informed. 0: Release of a link connection by a defined procedure (RC_EXPLICIT_DISCONNECT) 1: Release of a link connection by a timeout of packet (RC_PACKET_TIMEOUT) 2: Release of a link connection by a communication resource (RC_FAIL_NORESOURCE) 3~127: Reserved 128~255: RC_VENDOR_SPECIFIC |

The ReasonCode field of Table 12 is explained as follows.

An RC_EXPLICIT_DISCONNECT value indicates that a link connection is released by a link connection release procedure generated by a client or network. An RC_PACKET_TIMEOUT value indicates that a link connection is released because and acknowledgment (ACK) for a transmitted packet is not received within a predetermined time. An RC_FAIL_NORESOURCE value indicates that a link connection is released because there is no resource to maintain the connection. An RC_VENDOR_SPECIFIC value explains why a link connection has been released upon determination by a communication provider.

FIG. 11 is a flowchart of a procedure for discovering whether a correspondent node of communication supports an MIH function (MIHF) through an Internet Protocol (IP), in case of Layer 3, for example. Referring to FIG. 11, a mobile terminal transmits an MIH_Capability_Discover.request message to an IP address discovered while configuring a communication connection with a correspondent node [S1110]. Furthermore, the mobile terminal drives a timer during the transmission of the message [S1120]. The correspondent node, which supports the MIHF, can receive the message and then transmits an MIH_Capability_Discover.response message in response to the received message [S1130]. Because a response message arrives before the expiration of the timer, the mobile terminal can discover that the correspondent node supports the MIHF.

Congestion Control Mechanism of TCP

1. Fast Retransmit

A loss recovery process of every transmission control protocol (TCP) starts from Fast Retransmit. Prior to explaining an operation of Fast Retransmit, it is necessary to understand Duplicate Acknowledgement. Referring to FIG. 12, it is assumed that packets 1 to 4 are transmitted while a size of a window is four. Furthermore, the packet 2 is lost during transmission.

The TCP informs a transmitting source (Host A) of a last packet so far received among packets normally received each time a packet is received. This operation is called Cumulative Acknowledgement. Accordingly, a receiving source (Host B) having received the packet 1 transmits an acknowledgement packet to the transmitting source (Host A) indicating that it is ready to receive the packet 2, i.e., that packets including the packet 1 were normally received.

Because the packet 2 is lost in the course of transmission, the receiving source receives the packet 3 while not receiving the packet 2. Thus, the receiving source having received the packet 3 delivers the same acknowledgement packet indicating that the received last packet is the packet 1 and that it is ready to receive the packet 2 again. This scenario is called Duplicate Acknowledgement.

In case of receiving three Duplicate Acknowledgements, the transmitting source concludes that the corresponding packet was lost and retransmits the lost packet immediately, which is a basic operation of a Fast Retransmit Algorithm. In case of not using Fast Retransmit, the transmission is always re-initiated after expiration of a retransmission timeout if a packet loss takes place. Hence, Fast Retransmit considerably enhances the performance of the TCP.

FIG. 13 is a graph of a size variation of a window according to Fast Retransmit. Referring to FIG. 13, a lost packet is generated when a size of a window is W(loss). After the lost packet is retransmitted according to Fast Retransmit, a value of a slow start threshold (ssthresh) is set to W(loss)/2, wherein there is no special theoretical background for reducing the value to a half.

Assuming that w packets are transmitted if a size of a window of a transmitting source in slow start mode is w, a size of a window in case of receiving w acknowledgement packets becomes 2w, and 2w packets are transmitted. If a packet loss takes place at this point in time, the corresponding packet is retransmitted by Fast Retransmit and the value of ssthresh is reduced to w, which is half of a current window size. Accordingly, an approximate maximum size of the window having no packet loss is w. Hence, in subsequent transmissions, the window is set to be increased by Slow Start until this value.

Moreover, according to the related art, Additive Increase Multiplicative Decrease of a window used in a congestion control protocol based on another window as well as TCP shows the best performance in providing fairness in case that there exist many transmitting sources.

As shown in FIG. 13, after the corresponding packet is successfully retransmitted, the size of the window is set to 1 again. Also, the window size increases to the half-reduced ssthresh in slow start mode. In case that it is impossible to recover the lost packet by Fast Retransmit, slow start begins after the expiration of a retransmission timeout. In this case, the value of ssthresh corresponds to a half of the window prior to the occurrence of the packet loss.

2. Fast Recovery

The appearance of a Fast Recovery Algorithm is closely associated with an abrupt increase of a data rate of a network. In general, a connection between a transmitting source and a receiving source is called a pipe. The product of a round trip time (RTT) and an approximate data rate is called a Bandwidth-Delay-Product (BDP). A connection on a network having a considerable data rate and transfer delay such as a satellite network is expressed as a Long-Fat Pipe. Thus, when a BDP is considerably large, it is highly probable that a window will increase correspondingly. Accordingly, the number of outstanding packets, which are currently transmitted and not yet acknowledged, corresponds to a large value as well. Fast Recovery is explained with reference to FIG. 14 as follows.

FIG. 14 is a diagram of a process for performing Fast Retransmit when a packet (packet 1) is lost while a transmitting source and a receiving source are connected together by a pipe having a Neighbor Discovery Protocol (NDP) equal to a size of 16 packets. Referring to FIG. 14, three duplicate acknowledgements for packet 1 are delivered. A transmitting source having received the duplicate acknowledgements retransmits them by Fast Retransmit. In this case, 12 packets corresponding to 75% of a total capacity still remain in the pipe. Namely, since information for the current pipe can be sufficiently obtained from the remaining 12 packets, i.e., since a clocked-state can be maintained, or since probing is possible, it is unnecessary to initiate Slow Start again after Fast Retransmit.

Therefore, if the lost packet is successfully retransmitted by Fast Retransmit, subsequent transmissions are continually performed with a window set to a value of ssthresh in Congestion Avoidance mode. For Fast Recovery, the transmitting source increments a size of the window by 1 each time a duplicate acknowledgement packet is received. If a packet, which is not yet transmitted, is included in the window, the corresponding packet is transmitted. By these packets, it is possible to maintain a synchronized state of the pipe.

According to a previous design of the TCP congestion control, packet transmission is mainly performed on a reliable wire link, i.e., on a link having a low possibility of losing a packet due to transmission error. Thus, the TCP congestion control mechanism is designed to interpret all packet losses as congestion occurrences in a network and considerably reduce a corresponding size of a window or stop a retransmission timeout (RTO) packet transmission for a period of time. However, when the TCP operates on a radio link, a bit error rate (BER) of a radio link is originally higher than that of a wired network. Bit errors can have continuity due to Multi-Path Fading and a connection is occasionally reconfigured due to migration of a user equipment. Therefore, these factors contribute to packet losses detected by the TCP operating in a radio environment regardless of the congestion of the network. The packet losses, which are frequently called non-congestion packet losses, force the TCP to induce an unnecessary loss recovery process or RTO, thereby reducing a size of a congestion window to lower a data rate of a transmitting source.

FIG. 15 is a structural diagram of a relationship between an MIH function (MIHF) and other layers. The figure shows how the MIHF interacts with upper and lower layers in order to send and receive MIH function messages related to an MIHF user, including a TCP.

FIG. 16 is a structural diagram of a protocol. An MIH_TCP_SAP defines an interface between an MIHF and a TCP. An MIH_TCP_SAP is used to convey link layer status information to MIH users including the TCP. The MIH_TCP_SAP simply defines functions between the TCP and the MIHF. Furthermore, as long as an MIH_SERVICE_SAP has the same functionality as the MIH_TCP_SAP, then the MIH_SERVICE_SAP can replace the functions of the MIH_TCP_SAP described herein.

SUMMARY OF THE INVENTION

The present invention is directed to reporting link layer status information using a heterogeneous network handover module.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a method for reporting link layer status information using a heterogeneous network handover module, the method comprising establishing communication between a mobile terminal and at least one of a homogeneous and heterogeneous network, reporting status information of a radio link connecting the mobile terminal and the at least one of a homogeneous and heterogeneous network to a heterogeneous network handover module of the mobile terminal, wherein the heterogeneous network handover module is configured to provide convergence of information from the at least one network interface module associated with the at least one of a homogeneous and heterogeneous network into a unified presentation, and reporting the status information of the radio link from the heterogeneous network handover module to an upper management entity of the mobile terminal if the heterogeneous network handover module determines a predetermined condition is satisfied.

In one aspect of the invention, the method further comprises establishing communication between the mobile terminal, the at least one of a homogeneous and heterogeneous network and a remote upper management entity, and reporting the status information of the radio link from the heterogeneous network handover module to the remote upper management entity if the heterogeneous network handover module determines the predetermined condition is satisfied.

Preferably, the remote upper management entity is located in the at least one of a homogeneous and heterogeneous network. Alternatively, the remote upper management entity is located at a correspondent node not within the at least one of a homogeneous and heterogeneous network.

Preferably, in the step of reporting the status information of the radio link to the remote upper management entity, the status information is first processed by a heterogeneous network handover module operating under the remote upper management entity prior to being reported to the remote upper management entity.

Preferably, the predetermined condition is satisfied when a parameter of the status information of the radio link exceeds a threshold value. In one aspect, the threshold value is set by the upper management entity of the mobile terminal. In another aspect, the threshold value is set during registration of the upper management entity of the mobile terminal to the heterogeneous network handover module of the mobile terminal. In a further aspect, the threshold value is set during discovery of a heterogeneous network handover module of the at least one of a homogeneous and heterogeneous network. In yet another aspect, the threshold value is set during discovery of a heterogeneous network handover module of a remote entity. Preferably, the status information of the radio link is periodically reported once the parameter exceeds the threshold value.

Preferably, the predetermined condition is satisfied when a predetermined time for reporting the status information of the radio link has arrived. In one aspect, the predetermined time for reporting the status information of the radio link is set by the upper management entity of the mobile terminal. In another aspect, the predetermined time for reporting the status information of the radio link is set during registration of the upper management entity of the mobile terminal to the heterogeneous network handover module of the mobile terminal. In a further aspect, the predetermined time for reporting the status information of the radio link is set during discovery of a heterogeneous network handover module of the at least one of a homogeneous and heterogeneous network. In yet another aspect, the predetermined time for reporting the status information of the radio link is set during discovery of a heterogeneous network handover module of a remote entity. Preferably, the status information of the radio link is periodically reported once the predetermined time has arrived.

Preferably, the upper management entity is a transmission control protocol (TCP) entity and the remote upper management entity is a remote transmission control protocol (TCP) entity. Preferably, the upper management entity is at least one of a transmission control protocol (TCP), a device manager, a handover control manager, a mobility management manager, and a User Datagram Protocol (UDP).

Preferably, the status information of the radio link is reported to the heterogeneous network handover module when a parameter of the status information exceeds a threshold value. In one aspect, the threshold value is set by the upper management entity of the mobile terminal. In another aspect, the threshold value is set during registration of the upper management entity of the mobile terminal to the heterogeneous network handover module of the mobile terminal. In a further aspect, the threshold value is set during discovery of a heterogeneous network handover module of the at least one of a homogeneous and heterogeneous network. In yet another aspect, the threshold value is set during discovery of a heterogeneous network handover module of a remote entity.

Preferably, the status information of the radio link is reported to the heterogeneous network handover module periodically. In one aspect, a period for reporting the status information of the radio link is set by the upper management entity of the mobile terminal. In another aspect, a period for reporting the status information of the radio link is set during registration of the upper management entity of the mobile terminal to the heterogeneous network handover module of the mobile terminal. In a further aspect, a period for reporting the status information of the radio link is set during discovery of a heterogeneous network handover module of the at least one of a homogeneous and heterogeneous network. In yet another aspect, a period for reporting the status information of the radio link is set during discovery of a heterogeneous network handover module of a remote entity.

Preferably, the status information comprises at least one of a bit error rate (BER), a carrier-to-interference-and-noise ratio (CINR), a signal-to-noise ratio (SNR), a received signal strength indicator (RSSI), a frame loss rate, and a link speed.

In accordance with another embodiment of the present invention, the method further comprises reporting the status information of a radio link connecting the mobile terminal and the at least one of a homogeneous and heterogeneous network to a heterogeneous network handover module of the at least one of a homogeneous and heterogeneous network, and reporting the status information of the radio link from the heterogeneous network handover module of the at least one of a homogeneous and heterogeneous network to the remote upper management entity if the heterogeneous network handover module of the at least one of a homogeneous and heterogeneous network determines a predetermined condition is satisfied.

Preferably, reporting the status information of the radio link from the heterogeneous network handover module of the at least one of a homogeneous network and heterogeneous network to the remote upper management entity is requested by the mobile terminal.

Preferably, the predetermined condition is satisfied when a parameter of the status information of the radio link exceeds a threshold value. In one aspect, the threshold value is set by the mobile terminal. In another aspect, the threshold value is set during registration of an upper management entity of the at least one of a homogeneous and heterogeneous network to the heterogeneous network handover module of the at least one of a homogeneous and heterogeneous network. In a further aspect, the threshold value is set during discovery of a heterogeneous network handover module of the mobile terminal. In yet another aspect, the threshold value is set during discovery of a heterogeneous network handover module of a remote entity. Preferably, the status information of the radio link is periodically reported once the parameter exceeds the threshold value.

Preferably, the predetermined condition is satisfied when a predetermined time for reporting the status information of the radio link has arrived. In one aspect, the predetermined time for reporting the status information of the radio link is set by the mobile terminal. In another aspect, the predetermined time for reporting the status information of the radio link is set during registration of an upper management entity of the at least one of a homogeneous and heterogeneous network to the heterogeneous network handover module of the at least one of a homogeneous and heterogeneous network. In a further aspect, the predetermined time for reporting the status information of the radio link is set during discovery of a heterogeneous network handover module of the mobile terminal. In yet another aspect, the predetermined time for reporting the status information of the radio link is set during discovery of a heterogeneous network handover module of a remote entity. Preferably, the status information of the radio link is periodically reported once the predetermined time has arrived.

In accordance with another embodiment of the present invention, the method further comprises reporting status information of a radio link connecting the mobile terminal and the at least one of a homogeneous and heterogeneous network to a heterogeneous network handover module of the at least one of a homogeneous and heterogeneous network, and reporting the status information of the radio link from the heterogeneous network handover module of the at least one of a homogeneous and heterogeneous network to the heterogeneous network handover module of the mobile terminal if the heterogeneous network handover module of the at least one of a homogeneous and heterogeneous network determines a predetermined condition is satisfied.

Preferably, the method further comprises reporting the status information from the heterogeneous network handover module of the mobile terminal to the remote upper management entity if the heterogeneous network handover module of the mobile terminal determines a predetermined condition is satisfied. Preferably, the remote upper management entity is located in the at least one of a homogeneous and heterogeneous network. Alternatively, the remote upper management entity is located at a correspondent node not within the at least one of a homogeneous and heterogeneous network.

Preferably, in the step of reporting the status information of the radio link to the remote upper management entity, the status information is first processed by a heterogeneous network handover module operating under the remote upper management entity prior to being reported to the remote upper management entity.

Preferably, the predetermined condition is satisfied when a parameter of the status information of the radio link exceeds a threshold value. In one aspect, the threshold value is set by the mobile terminal. In another aspect, the threshold value is set during registration of an upper management entity of the at least one of a homogeneous and heterogeneous network to the heterogeneous network handover module of the at least one of a homogeneous and heterogeneous network. In a further aspect, the threshold value is set during discovery of a heterogeneous network handover module of the mobile terminal. In yet another aspect, the threshold value is set during discovery of a heterogeneous network handover module of a remote entity. Preferably, the status information of the radio link is periodically reported once the parameter exceeds the threshold value.

Preferably, the predetermined condition is satisfied when a predetermined time for reporting the status information of the radio link has arrived. In one aspect, the predetermined time for reporting the status information of the radio link is set by the mobile terminal. In another aspect, the predetermined time for reporting the status information of the radio link is set during registration of an upper management entity of the at least one of a homogeneous and heterogeneous network to the heterogeneous network handover module of the at least one of a homogeneous and heterogeneous network. In a further aspect, the predetermined time for reporting the status information of the radio link is set during discovery of a heterogeneous network handover module of the mobile terminal. In yet another aspect, the predetermined time for reporting the status information of the radio link is set during discovery of a heterogeneous network handover module of a remote entity. Preferably, the status information of the radio link is periodically reported once the predetermined time has arrived.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

FIG. 10 is a diagram of an MIH packet message format.

DETAILED DESCRIPTION OF THE PREFERRED EMBODIMENTS

The present invention relates to reporting link layer status information using a heterogeneous network handover module in a mobile communication system, wherein packet loss attributed to congestion may be identified from packet loss attributed to non-congestion.

Reference will now be made in detail to the preferred embodiments of the present invention, examples of which are illustrated in the accompanying drawings. Wherever possible, the same reference numbers will be used throughout the drawings to refer to the same or like parts.

In accordance with one embodiment of the present invention, a method of the present invention comprises the following steps for end-to-end user equipments (UEs) in communication to use information of a link layer delivered to an MIH function (MIHF) by configuring a TCP connection.

First, during an end-to-end MIHF capability discovery step, a first user equipment supporting an MIHF, which communicates by configuring a TCP session, discovers whether another user equipment in communication supports an MIHF to use link layer information provided by the MIHF of the first user equipment.

Second, during a registration step for requesting necessary link layer information, link layer information necessary for communication between end-to-end user equipments configuring a TCP session is registered to a correspondent user equipment.

Third, during a link layer information delivery step, link layer information registered according to the registration step is remotely delivered to the correspondent user equipment if the link layer information is generated.

Figure 1:
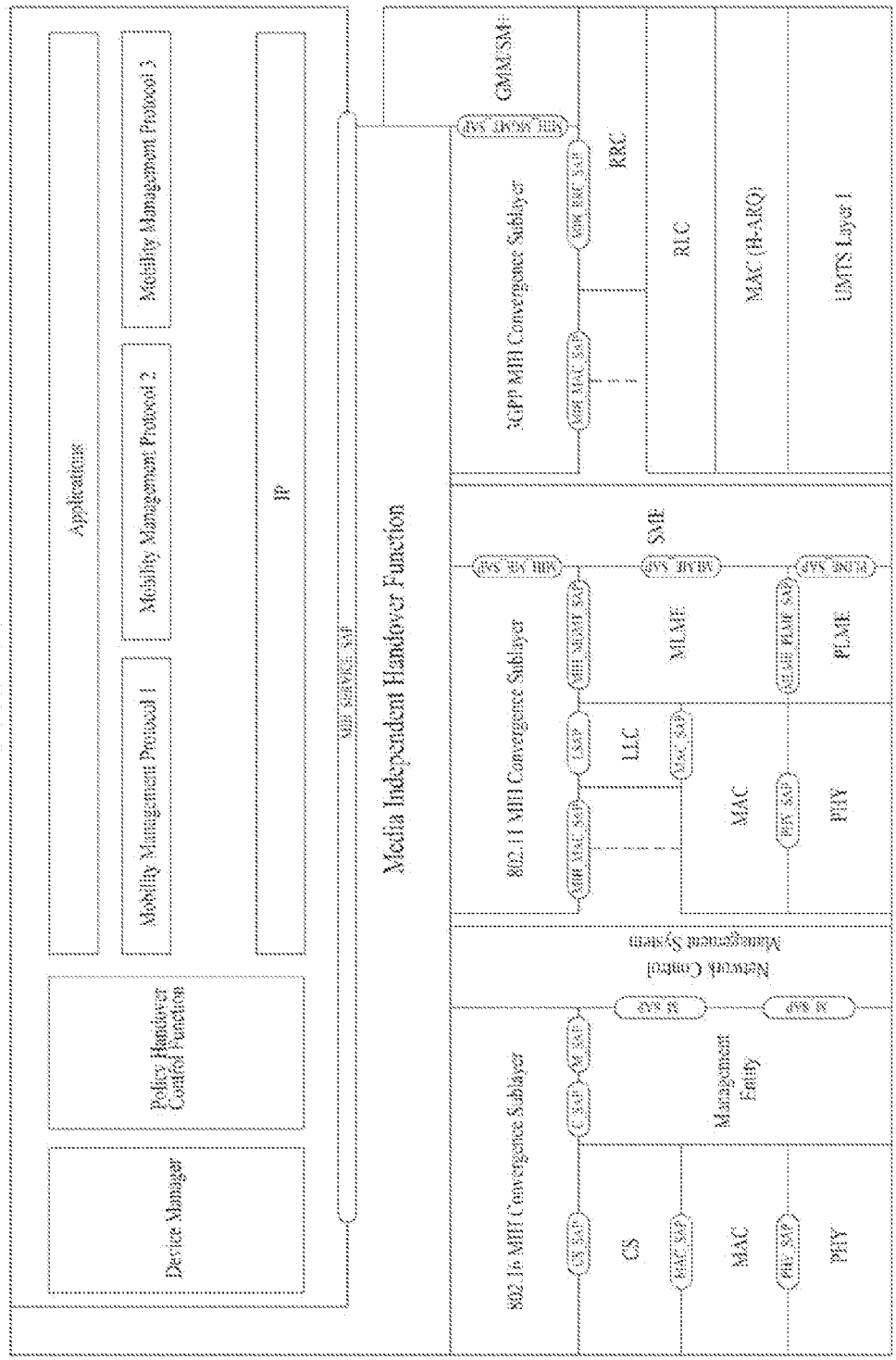
FIG. 1 is an exemplary diagram of a mobile terminal supporting a media independent handover (MIH) function.
Figure 2:
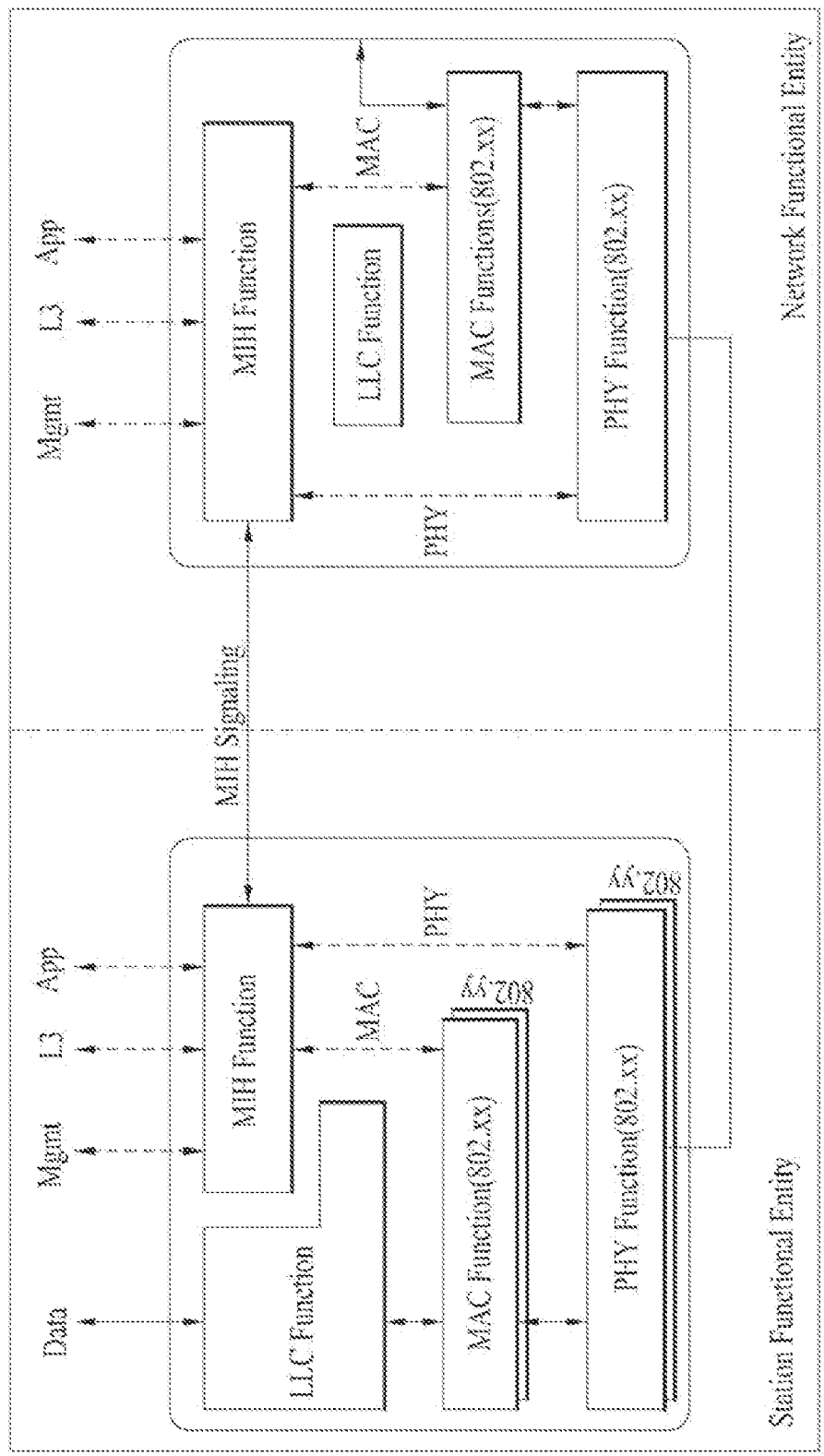
FIG. 2 is a block diagram of functional entities and a transport protocol of a user equipment including an MIH function and a network.
Figure 3:
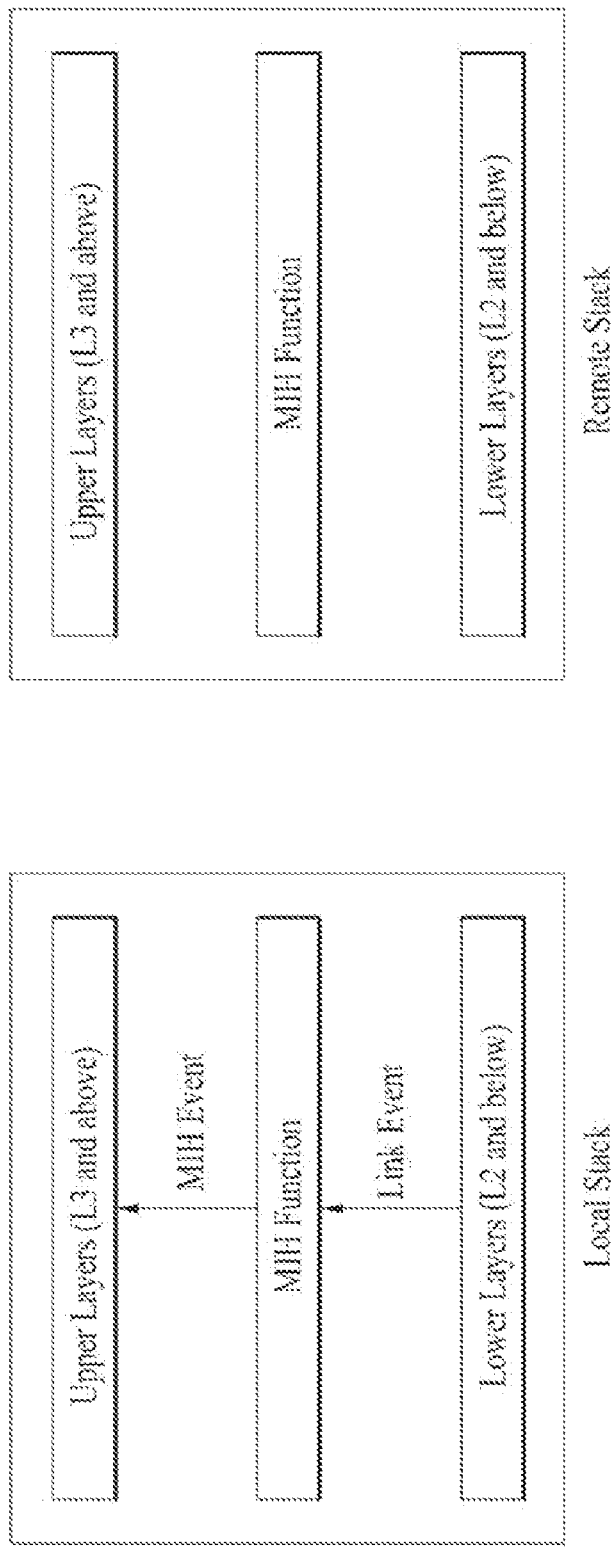
FIG. 3 is a block diagram of a local event model and an MIH event model.
Figure 4:
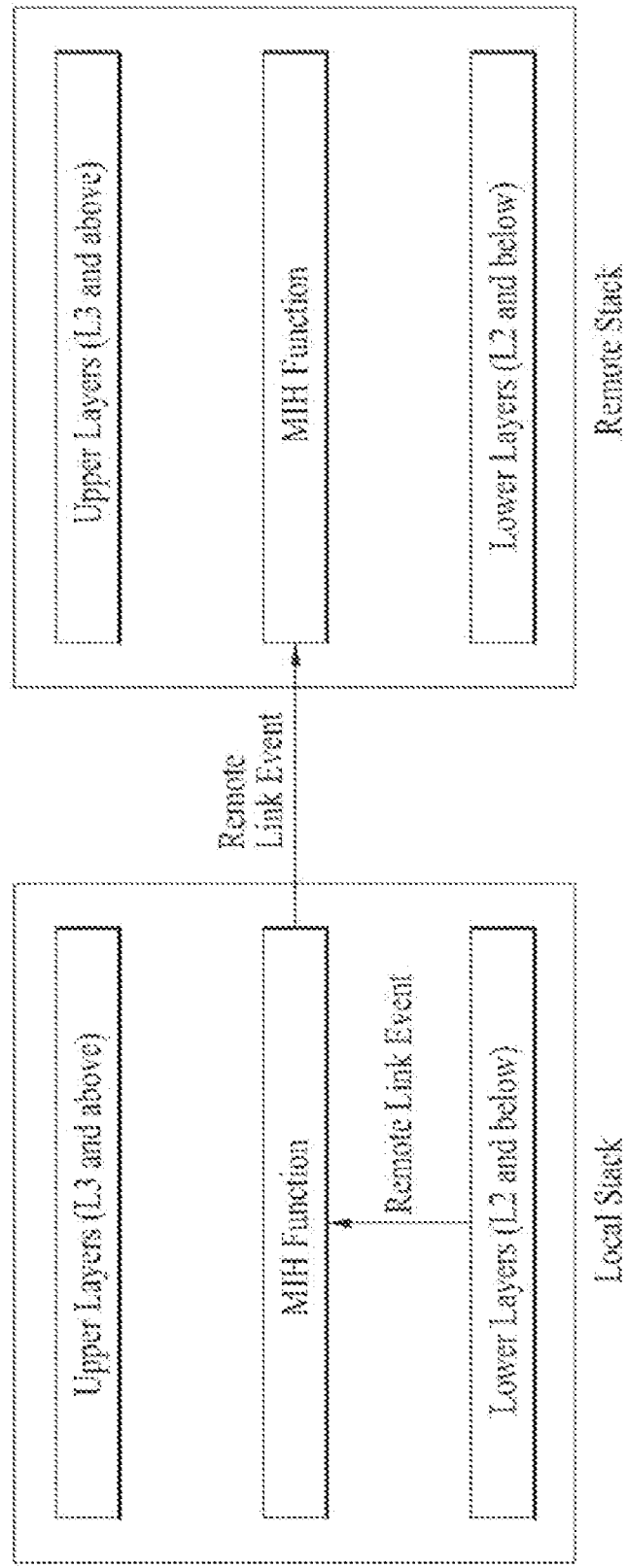
FIG. 4 is a block diagram of a remote link event model.
Figure 5:
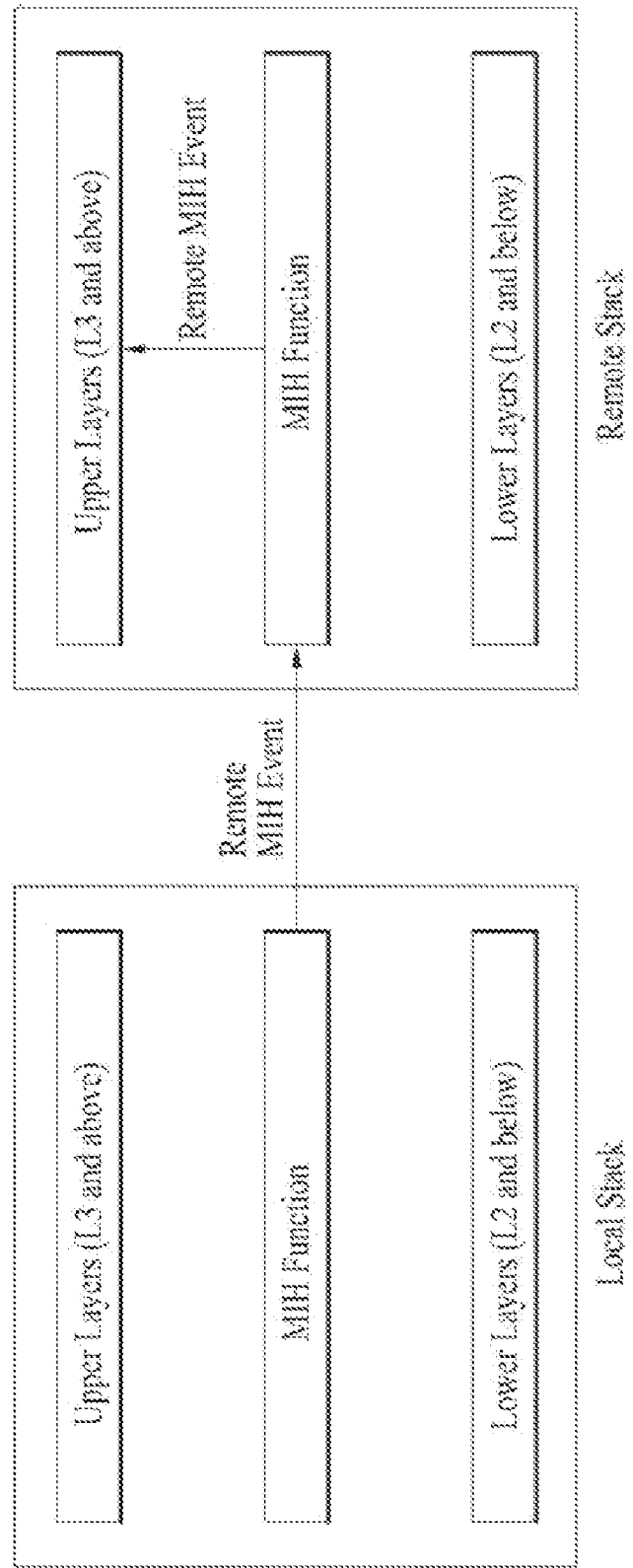
FIG. 5 is a block diagram of a remote MIH event model.
Figure 6:
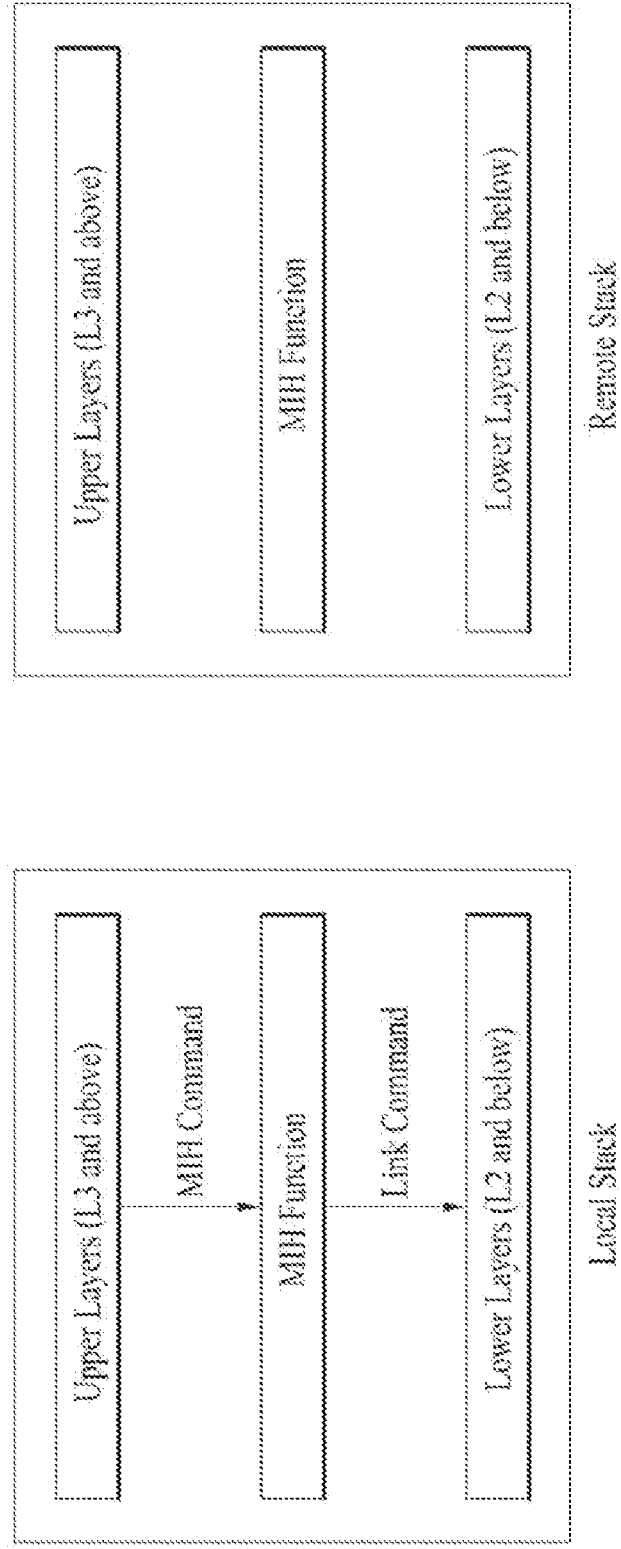
FIG. 6 is a block diagram of an MIH command model and a link command model.
Figure 7:
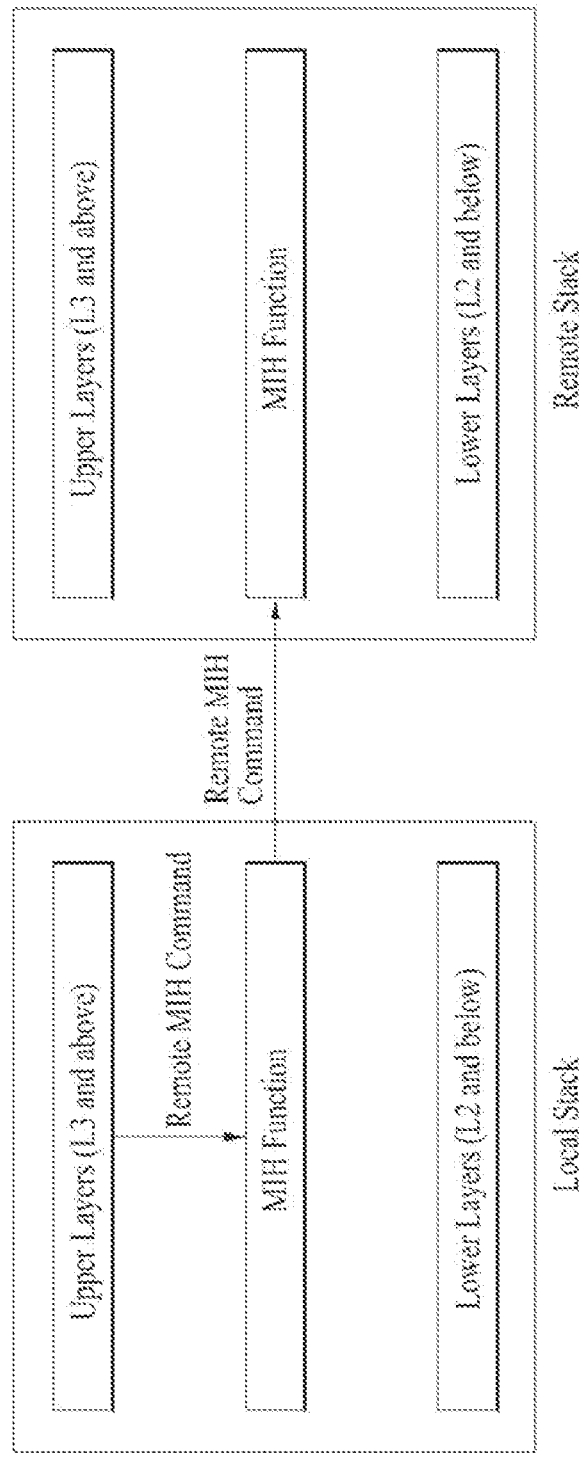
FIG. 7 is a block diagram of a remote MIH command model.
Figure 8:
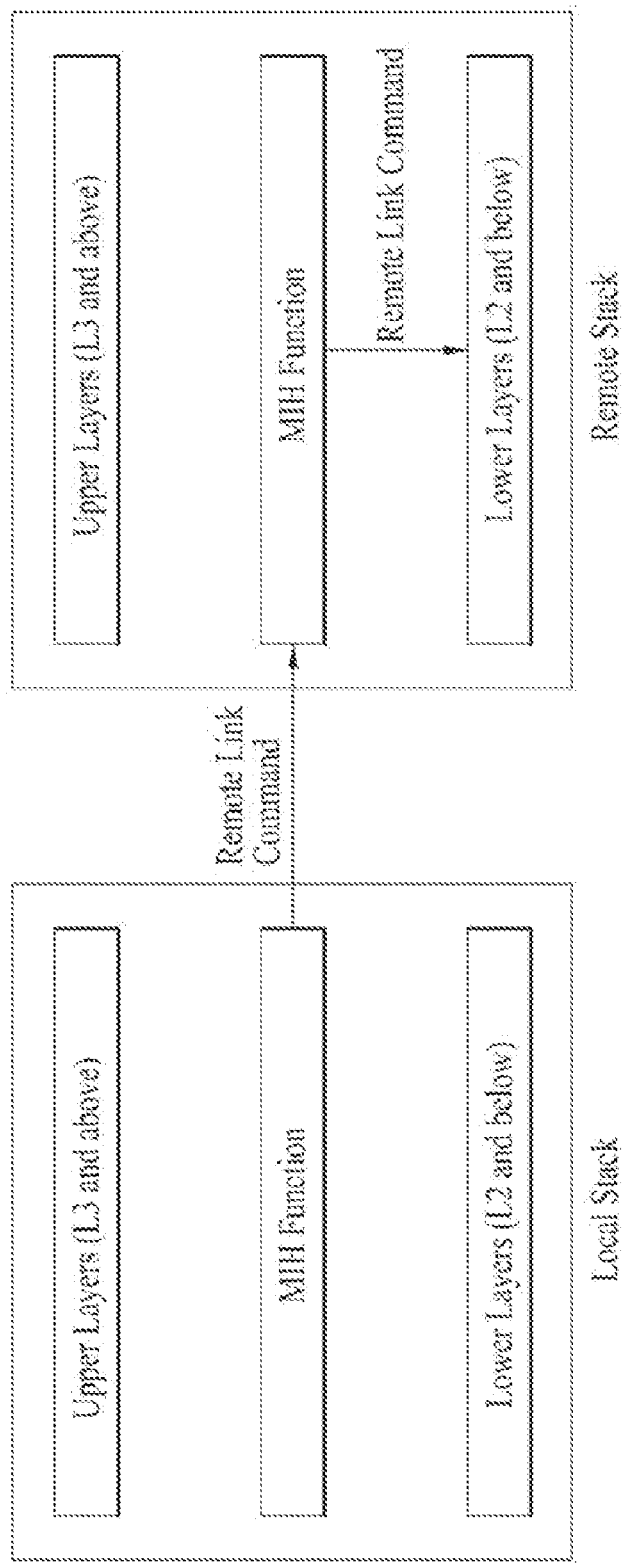
FIG. 8 is a block diagram of a remote link command model.
Figure 9:
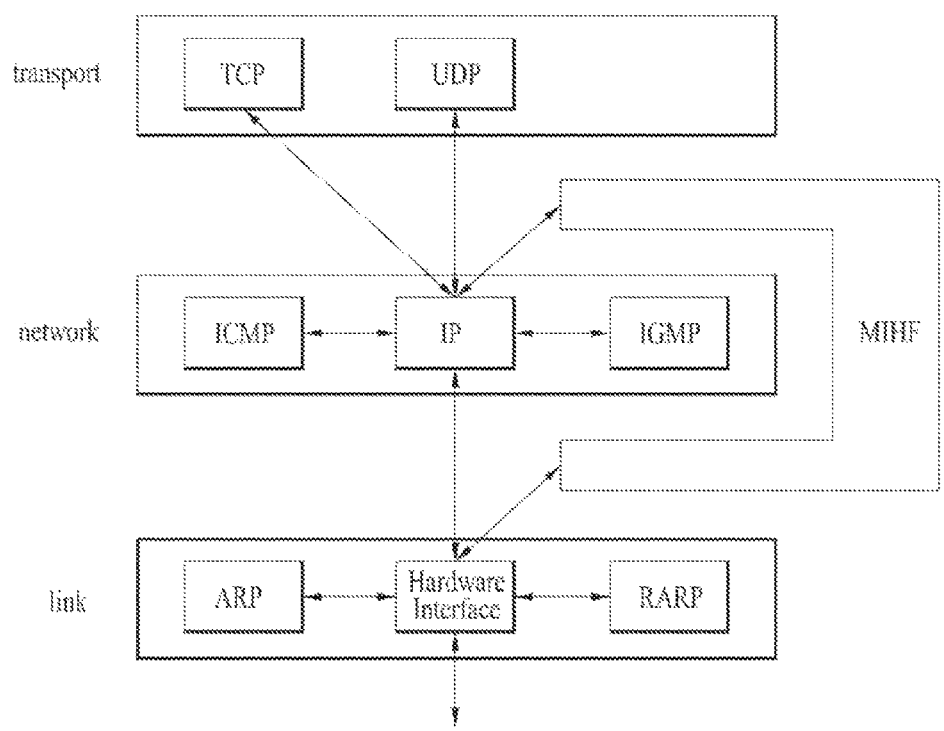
FIG. 9 is a block diagram of a relationship between an MIH function and another protocol layer within a stack.
Figure 11:
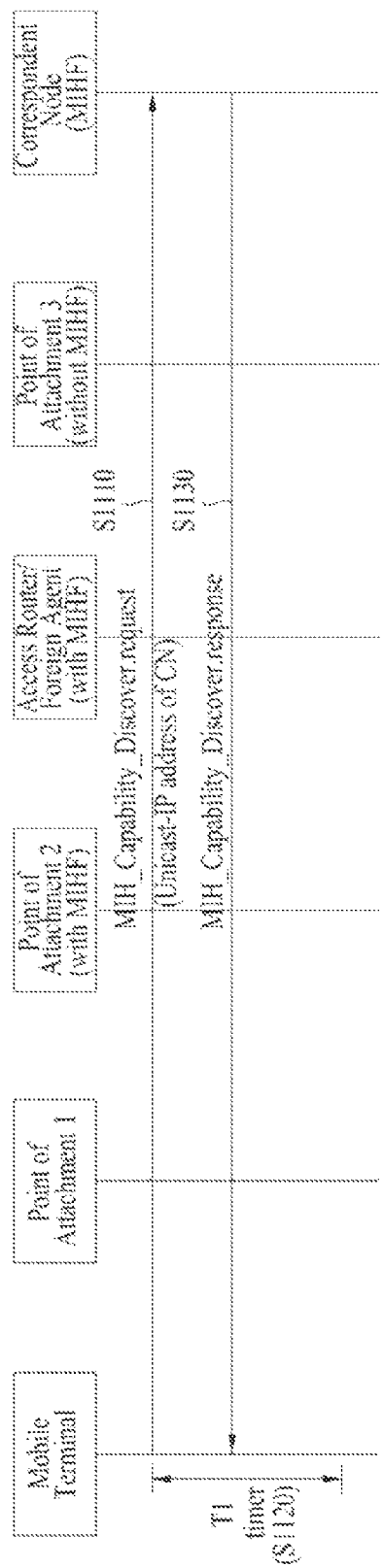
FIG. 11 is a flowchart of a procedure for discovering whether a correspondent node of communication supports an MIH function through an Internet protocol (IP).
Figure 12:
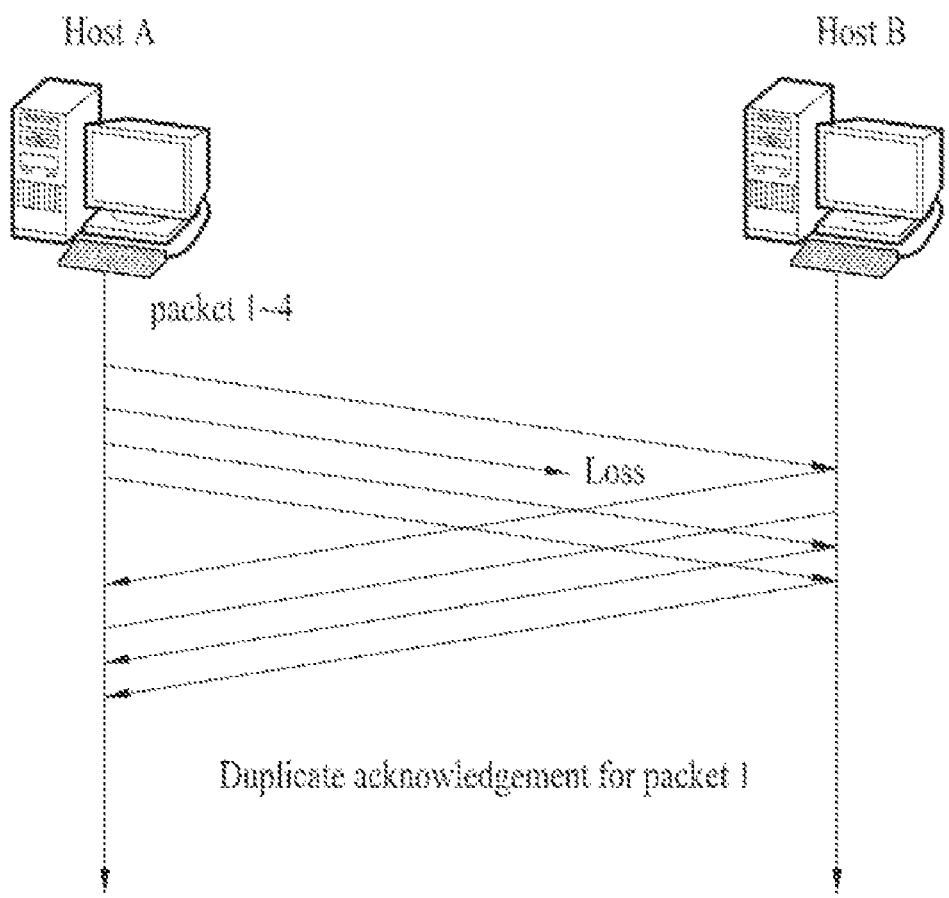
FIG. 12 is a diagram for explaining an example of duplicate acknowledgement between a transmitting and receiving source.
Figure 13:
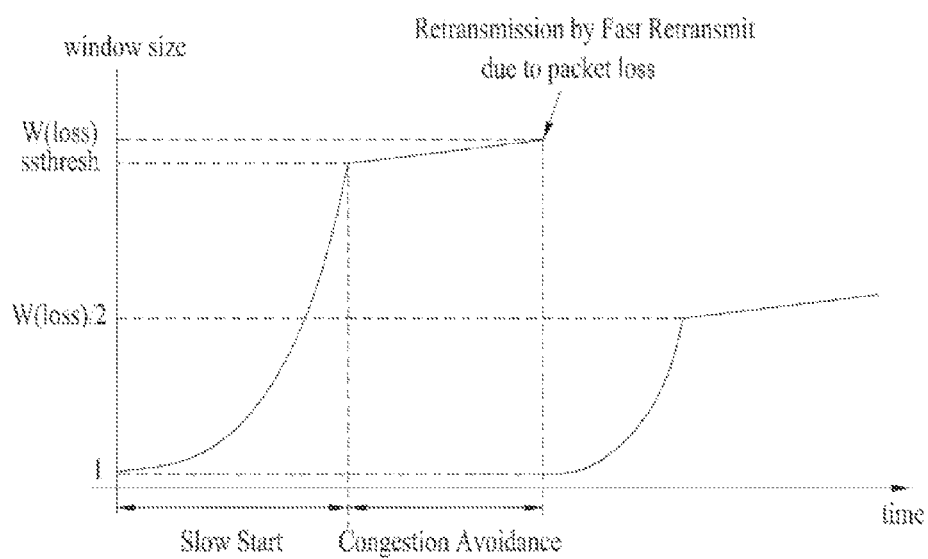
FIG. 13 is a graph of a size variation of a window according to Fast Retransmit.
Figure 14:
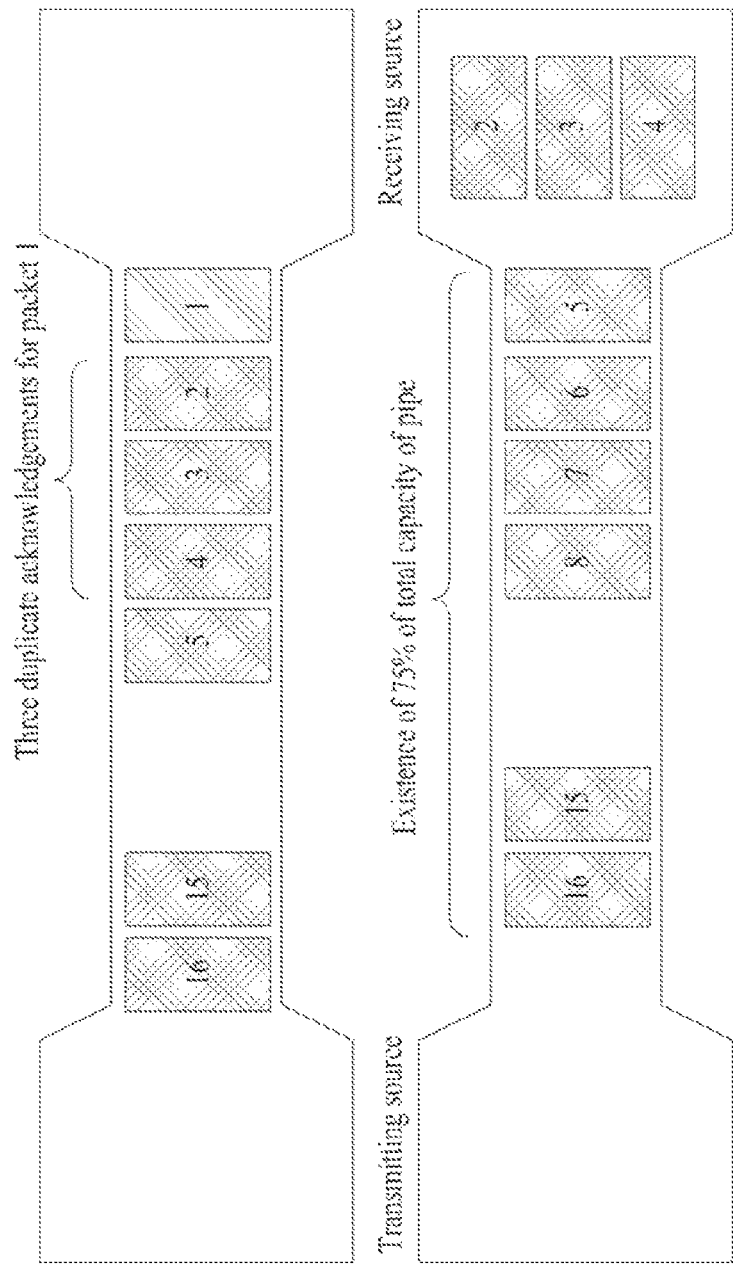
FIG. 14 is a diagram of packets within a pipe for explaining Fast Recovery.
Figure 15:
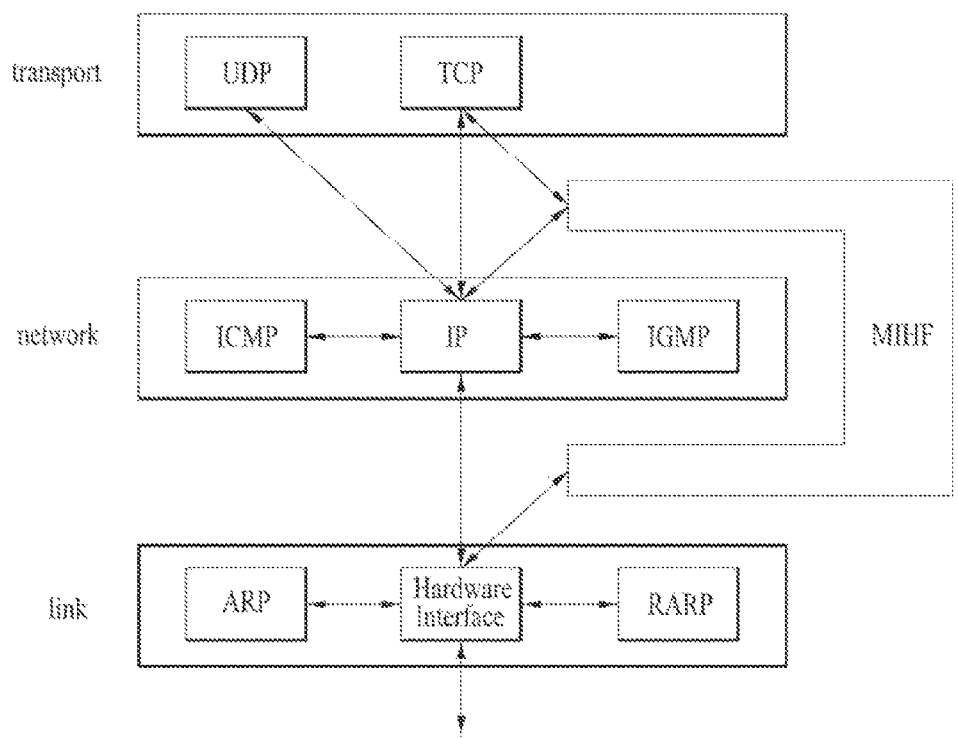
FIG. 15 is a structural diagram of a relationship between an MIH function and other layers.
Figure 16:
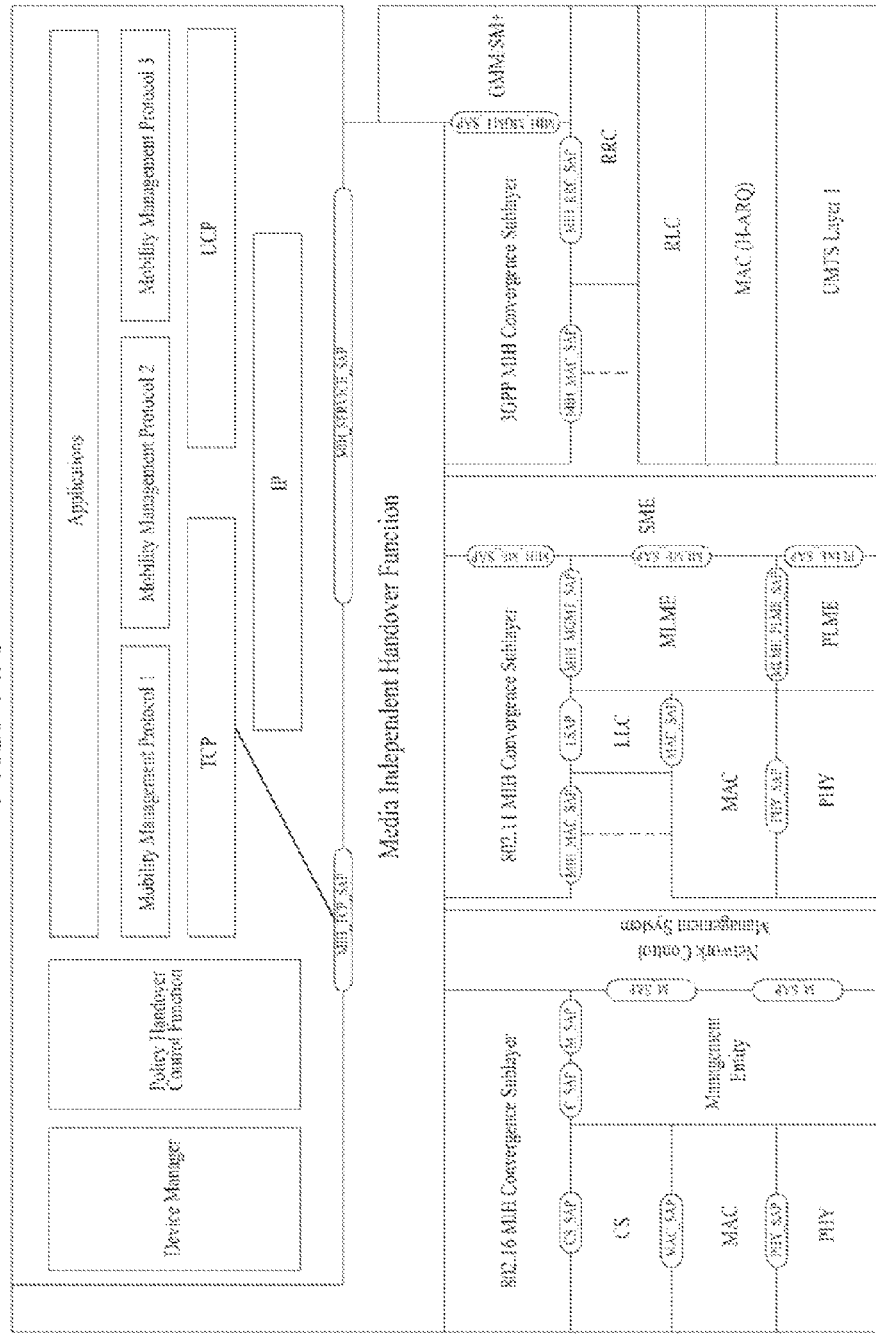
FIG. 16 is a structural diagram of a protocol.
Figure 20:
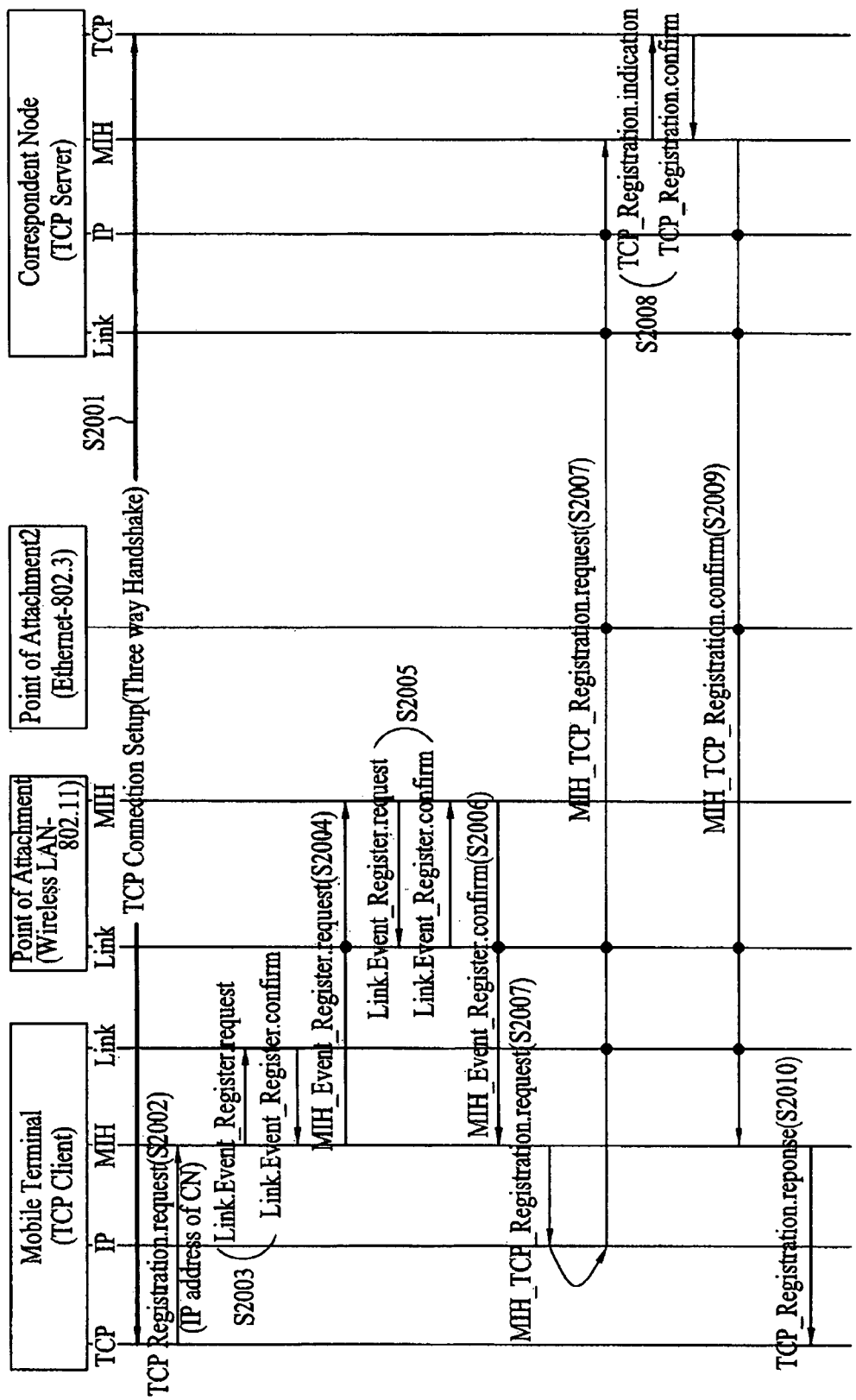
FIG. 20 is a flowchart of a method for detecting and registering whether an MIH function is supported by a correspondent node according to a request of a TCP of a mobile terminal in accordance with one embodiment of the present invention.

A protocol structure in accordance with one embodiment of the present invention is shown in FIG. 20. As shown, an MIHF interfaces with a Layer 3 entity, such as an IP for MIH message transmission, and a Layer 2 entity, such as an Ethernet and other upper layers. FIG. 20 also shows a protocol architecture wherein the MIHF interoperates with an IP and a hardware interface, such as an IEEE 802.11 Wireless LAN. The MIHF can also provide link layer information to a TCP by interoperating with the TCP. Preferably, the MIHF can communicate via an MIH_SERVICE_SAP shown in FIG. 1 for interoperating with the TCP. Alternatively, the MIHF can interface via an MIH_TCP_SAP, as described in FIG. 21.

In accordance with the present invention, primitives added or modified for the present invention are explained as follows. These primitives are exchanged between local protocol stacks.

1. TCP_Registration.request 1.1 Function

A TCP_Registration.request primitive is a primitive used by a TCP for requesting to provide information of an event occurring in a lower layer to an MIH. Preferably, if the primitive includes an address of a correspondent party a TCP is communicating with, the primitive is for requesting from an MIH function of a local stack information related to whether a correspondent node provides an MIH function. The primitive may reference a link status of a link that the TCP requests a report from via the MIH function. Preferably, the primitive references a value of a link quality, such as a carrier-to-interference-plus-noise-ratio (CINR) value, a bit error rate (BER) value and the like. When such a primitive is provided to the MIH function, the MIH function sets a threshold to this value, and a link quality associated event exceeding this value can be delivered to the TCP.

1.2 Semantics

TCP_Registration.request
(
Source,
Requested Event List
Link Quality Threshold
Link Status Report Period
Correspondent Node IP address
TCP Session Port number
TCP type
)

TABLE 13

| Name | Type | Valid Range | Description |
| --- | --- | --- | --- |
| Source | | N/A | Source requesting an event |
| RequestedEventList | Set of Event IDs | Set of valid link layer events | List of specific events to be delivered (e.g., Link Up, Link Down, Link Status Report, etc.) |
| Link Quality Threshold | | | Specific reference in receiving inclusive Link Status Report in case of registering Link Status Report Event (e.g., BER, CINR, RSSI, etc.) |
| Link Status Report Period | | | Period for reporting a link quality status in case of a link quality becomes poorer than a threshold |
| Correspondent Node address | IP Address | | IP address of a correspondent node for which a TCP session is currently configured |
| TCP Session Port number | Port number | | Port number of a currently configured TCP session |
| TCP type | Enumeration | | Tahoe<br>Reno<br>Vegas |

1.3 Generation Timing Point

The TCP_Registration.request primitive is generated at a point in time when a registration needs to be made to an MIHF when attempting to receive information for a link status after a TCP has configured an end-to-end session for communication.

1.4 Effect on Reception

When receiving the TCP_Registration.request primitive, an MIHF carries out actions depending on parameters included therein. First, if a Correspondent Node address is included in the primitive, a procedure for discovering whether the Correspondent Node supports an MIH function is carried out. Secondly, if a RequestedEventList field is included in the primitive, a link event registration procedure is carried out to enable a link layer to deliver information for corresponding events to the MIH function. After the procedure has been carried out according to the parameters, a TCP_Registration.response primitive is generated to return a result.

2. TCP_Registration.response 2.1 Function

After an MIHF has performed a procedure for the TCP_registration.request primitive delivered to the MIHF, a TCP_Registration.response primitive informs the TCP of a corresponding result. The TCP_Regisration.response primitive can inform the TCP of various reasons for MIHF actions, including a reason for why a registration procedure has failed. When a correspondent node provides an MIH_Capability_Discover.response message or an MIH_TCP_Registration.comfirm message, in which link-associated information registered and offered by the correspondent node is included, the TCP_Registration.response primitive includes the link-associated information to deliver.

2.2 Semantics

TCP_Registration.response
(
Source,
Registered Event List
Link Status Report Period
Remotely Registered Event List
Remote Link Quality Threshold
Remote Link Status Report Period
Correspondent Node TCP type
Registration Result
)

2.3 Generation Timing Point

The TCP_Registration.response primitive is generated to notify a TCP the result of the registration request requested (TCP_Registration.request primitive). The TCP_Registration.response primitive is generated at a point in time when a procedure for the request is executed and completed. If necessary, a plurality of corresponding primitives can be transmitted, each of which carries a result of a corresponding procedure at a point in time when the corresponding procedure has been executed and completed.

2.4 Effect on Reception

If the TCP_Registration.response primitive is received, a result for a requested registration can be known.

3. TCP_Registration.indication 3.1 Function

ATCP_Registration.indication primitive notifies a TCP of a local stack that an MIH has received the MIH_Capability_Discover.request message or the MIH_TCP_Registration.request initiated by the TCP. ATCP connection to be delivered is identified by a delivered Port number included in the MIH_Capability_Discover request message or MIH_TCP_Registration.request message.

3.2 Semantics

TCP_Registration.indication
(
Source,
Remotely Registered Event List
Remote Link Quality Threshold
Remote Link Status Report Period
Sender IP address
Sender Port number
Sender TCP type
)

TABLE 14

| Name | Type | Valid Range | Description |
| --- | --- | --- | --- |
| Source | | N/A | Source that makes a request for an event |
| RequestedEventList | Set of Event IDs | Set of valid link layer events | List of events registered for a list of specific events to be delivered |
| Link Status Report Period | | | Report Period available for MIHF with reference to the received Report Period in making the request |
| Remotely Registered Event List | Set of Event IDs | Set of valid link layer events | List of remotely registered events (e.g., Link Up, Link Down, Link Status Report, etc.) |
| Remote Link Quality Threshold | | | Specific reference to receive remotely registered Link Status Report (e.g., BER, CINR, RSSI, etc.) |
| Remote Link Status Report Period | | | Period for reporting link quality status remotely in case that link quality becomes poorer than Threshold |
| Correspondent Node TCP type | | | Tahoe Reno Vegas |
| Registration Result | Registration result | | Execution Result on TCP_Registration.request Failure in discovering Correspondent Node MIHF Link event registration failure |

TABLE 15

| Name | Type | Valid Range | Description |
|---|---|---|---|
| Source | | N/A | Source that makes a request for an event |
| Remotely Registered Event List | Set of Event IDs | Set of valid link layer events | List of remotely registered events (e.g., Link Up, Link Down, Link Status Report, etc.) |
| Remote Link Quality Threshold | | | Specific reference to receive remotely registered Link Status Report (e.g., BER, CINR, RSSI, etc.) |
| Remote Link Status Report Period | | | Period for reporting link quality status remotely in case that link quality becomes poorer than Threshold |
| Sender IP address | | | IP address of a transmitting node having a TCP session set currently |
| Sender Port number | | | Port number of a currently set transmitting TCP session |
| Sender TCP type | | | Tahoe Reno Vegas |

3.3 Generation Timing Point

The TCP_Registration.indication primitive is generated when an MIH receives the MIH_Capability_Discover.request message or MIH_TCP_Registration.request message.

3.4 Effect on Reception

If a correspondent node in a TCP session has an MIHF, link information of the correspondent node will be delivered. Accordingly, an enhanced TCP congestion control scheme can be performed using the link information. After, a response is sent to the correspondent node.

4. TCP_Registration.confirm 4.1 Function

A TCP_Registration.confirm primitive facilitates sending a response for indicating that a current TCP will use information provided by an MIH of a correspondent node in response to the TCP_Registration.indication primitive received by the TCP via an MIH. The TCP_Registration.confirm primitive may include information, such as a type and period of link information, which can be additionally provided to the TCP by its MIH to be provided to the correspondent node to deliver. In this case, the TCP has to perform a Link Event registration procedure with the MIH prior to transmitting the TCP_Registation.confirm primitive.

4.2 Semantics

TCP_Registration.confirm
(
Source,
Registered Event List
Link Quality Threshold
Link Status Report Period
Sender Node IP address
TCP Session Port number
TCP type
)

TABLE 16

| Name | Type | Valid Range | Description |
|---|---|---|---|
| Source | | N/A | Source that makes a request for an event |
| RequestedEventList | Set of Event IDs | Set of valid link layer events | List of registered events |
| Link Quality Threshold | | | Specific reference to receive set in registering Link Status Report Event (e.g., BER, CINR, RSSI, etc.) |
| Link Status Report Period | | | Period for reporting link quality status in registering Link Status Report Event in case that link quality becomes poorer than Threshold |
| Sender Node address | IP Address | | IP address of a correspondent node having a TCP session set currently |
| TCP Session Port number | Port number | | Port number of a currently set TCP session |
| TCP type | Enumeration | | Tahoe Reno Vegas |

4.3 Generation Timing Point

The TCP_Registration.confirm primitive is generated when the TCP_Registration.request primitive requested by an MIH is received. To include parameters such as a Registered Event List, a Link Quality Threshold, a Link Status Report Period and the like, the TCP_Registration.confirm primitive is generated at a point in time of obtaining a result from executing a Link Event Registration.

4.4 Effect on Reception

When receiving the TCP_Registration.confirm primitive, an MIH remotely loads a result contained in the TCP_Registration.confirm primitive on an MIH_TCP_Registration.confirm primitive and transmits it.

5. Link_Status_Report.indication 5.1 Function

A Link_Status_Report.indication primitive is applicable to both a link event and an MIH event. In case of the link event, if an MIH specifically or periodically designates a link status for a link status report event registered by a Link_Event_Registration.request/response primitive, i.e., if a quality of link is degraded, the Link_Status_Report.indication primitive is delivered to the MIH.

In case of the MIH event, the Link_Status_Report.indication delivered to an MIH from a link layer can be transparently delivered to a TCP. If a link quality exceeds a link quality threshold set by a TCP or if the link quality having exceeded the threshold is improved to be equal to or lower than the reference, the Link_Status_Report.indication can be delivered. If the link quality exceeds the link quality threshold to be degraded, the Link_Status_Report.indication is reported according to a period decided by a TCP_Registration.request primitive.

The Link_Status_Report.indication primitive can include and deliver, in addition to link quality information, a link status, e.g., a Link Going Down message indicating that a link will be soon be disconnected, a Link Down message indicating that a link configuration is released, or a Link Up message indicating that a link is configured.

In this case, necessary parameters of the corresponding information can be delivered only or other event messages can be delivered by embedding it in a message.

5.2 Semantics
Link_Status_Report.indication
(
Source,
Measured Link Quality Value
Link Event (Embedded)
)

TABLE 17

| Name | Type | Valid Range | Description |
|---|---|---|---|
| Source | | N/A | Source that makes a request for an event |
| Measured Link Quality Value | | | Measured link quality value |
| Link Event | | | Events having taken place |

5.3 Generation Timing Point

The Link_Status_Report.indication primitive can be periodically generated. If a set threshold is exceeded, the primitive can be generated. If the set threshold is exceeded, the primitive is generated each period set in making a registration request.

5.4 Effect on Reception

When receiving the Link_Status_Report.indication primitive, a TCP identifies a non-congestion error and a congestion error from each other by considering a status of a wireless channel to perform an enhanced congestion control scheme. The TCP can perform an enhanced congestion control scheme in a manner identifying a non-congestion error and a congestion error from each other by knowing a handover execution by delivered link events, and by considering packet loss due to the handover execution.

Different from an original congestion control scheme, the enhanced congestion control scheme improves procedures of Fast Retransmit and Fast Recovery performed on the assumption of congestion occurrence. Even if an error is generated, TCP performance can be enhanced by freezing a reduction of "cwnd" in case of the non-congestion error.

In accordance with the present invention, remotely transmitted messages added or modified for the present invention are explained as follows.

1. MIH_Capability_Discover.request

When an MIHF capability of a correspondent node is searched according to a registration request made by a TCP, a type of a currently accessed network may be indicated by including the type in an MIH message payload. A requested TCP type may be indicated as well. If all TCP types are delivered by being set to 1, an effect that a current discovery is attributed by a request made by a TCP can be achieved. A Port number identifies a session of a currently connected TCP. Accordingly, a receiving side can recognize a TCP for delivery according to the Port number, used during demultiplexing of the TCP/User Datagram Protocol (UDP). In case that a mobile terminal is unable to know all information of uplink/downlink registers, a request for information offer to a point of attachment (POA) and POA-associated information acquired by the registration may also be included.

TABLE 18

| Name | Type (1 byte) | Length | Value |
|---|---|---|---|
| Link type | | 1 | Indicating a type of a currently connected link (playing a role in notifying a registered side of a link type of a registering side)<br>Bit #0: Ethernet (IEEE802.3)<br>Bit #1: Wireless LAN (IEEE 802.11)<br>Bit #2: Wireless MAN (IEEE 802.16)<br>Bit #3: Cellular (3GPP)<br>Bit #4: Cellular (3GPP2)<br>Bit #5: Wireless PAN (IEEE802.15)<br>6~7: Reserved |
| Registered Event List | | 1 | If an area of each bit is set to 1, it means that a corresponding service is remotely registered.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>Bit #6: Link Status Report<br>Bit #7: Reserved |
| Link Quality Threshold | | 1 | Reference value to receive Link Status Report established between MIH and Link according to a request made by TCP (e.g., BER, CINR, SNR, RSSI) |
| Link Status Report Period | | 1 | Unit ms (1 ms, 5 ms, 10 ms, etc, variable according to a transmit length of frame)<br>Period for reporting link quality status in case that link quality is poorer than threshold |

TABLE 18-continued

| Name | Type (1 byte) | Length | Value |
|---|---|---|---|
| TCP type | | 1 | Entity initiating MIH Capability Discovery notifies a communication correspondence of a TCP type. If all bits are set to 1, it means that the communication correspondence is informed of Discovery by TCP.<br>Bit #0: Tahoe<br>Bit #1: Reno<br>Bit #2: Vegas<br>3~7: Reserved |
| Port Number | | 1 | Port Number of a currently set TCP Session |
| Registered Event List at POA | | 1 | If an area of each bit is set to 1, it means that a corresponding service is remotely registered.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>Bit #6: Link Status Report<br>Bit #7: Reserved |
| POA Link Quality Threshold | | 1 | Reference value to receive Link Status Report established between MIH and Link according to a request made by TCP (e.g., BER, CINR, SNR, RSSI) |
| POA Link Status Report Period | | 1 | Unit ms (1 ms, 5 ms, 10 ms, etc, variable according to a transmit length of frame)<br>Period for reporting link quality status in case that link quality is poorer than threshold |

2. MIH_Capability_Discover.response

If a type of a currently accessed network or a TCP type is included in the MIH_Capability_Discover.request message, its Link type or TCP type is included in an MIH_Capability_Discover.response message to transmit. Even if it is recognized that discovery is attributed to the TCP since all TCP types are set to 1 in the MIH_Capability_Discovery.request message, the Link type and the TCP type may be included in the MIH_Capability_Discover.response message. After the MIHF has received the MIH_Capability_Discover.request message, if the TCP_Registration.indication primitive is delivered to the TCP because there exists information (port number, etc.) sufficient to recognize the TCP for delivery and information to be delivered in the received MIH_Capability_Discover.request message, a parameter included after the reception of TCP_registration.confirm primitive from the TCP is included in the MIH_Capability_Discover.response message to deliver.

TABLE 19

| Name | Type (1 byte) | Length | Value |
|---|---|---|---|
| Link type | | 1 | Indicating a type of a currently connected link (playing a role in notifying a registered side of a link type of a registering side)<br>Bit #0: Ethernet (IEEE802.3)<br>Bit #1: Wireless LAN (IEEE 802.11)<br>Bit #2: Wireless MAN (IEEE 802.16)<br>Bit #3: Cellular (3GPP)<br>Bit #4: Cellular (3GPP2)<br>Bit #5: Wireless PAN (IEEE802.15)<br>6~7: Reserved |
| Registered Event List | | 1 | If an area of each bit is set to 1, it means that a corresponding service is remotely registered.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>Bit #6: Link Status Report<br>Bit #7: Reserved |
| Link Quality Threshold | | 1 | Reference value to receive Link Status Report established between MIH and Link according to a request made by TCP (e.g., BER, CINR, SNR, RSSI) |
| Link Status Report Period | | 1 | Unit ms (1 ms, 5 ms, 10 ms, etc, variable according to a transmit length of frame)<br>Period for reporting link quality status in case that link quality is poorer than threshold |

TABLE 19-continued

| Name | Type (1 byte) | Length | Value |
|---|---|---|---|
| TCP Type | | 1 | Communication correspondence is informed of TCP type.<br>Bit #0: Tahoe<br>Bit #1: Reno<br>Bit #2: Vegas<br>3~7: Reserved |
| Port Number | | 1 | Port Number of a currently set TCP Session |

3. MIH_TCP_Registration.request

An MIH_TCP_Registration.request message is delivered when registering to a remote TCP after completion of a link event registration for the TCP_Registration.request primitive of the TCP. If the MIH_Capability_Discover.request message facilitates registration as well as discovers MIHF capability of a correspondent node of the TCP connection, inclusive parameters of the MIH_TCP_Registration.request message are identical to those of the MIH_Capability_Discover.request message. Moreover, it is possible to discover the MIHF capability of a correspondent node of the TCP connection using only the MIH_TCP_Registration.request message. Thus, an MIH_Capability_Discover.request/response exchange procedure would be unnecessary.

4. MIH_TCP_Registration.confirm

After an MIHF receives the MIH_TCP_Registration.request message and performs a registration procedure with its TCP, an MIH_TCP_Registration.confirm message is used to remotely transmit a corresponding result. If the MIH_Capability_Discover.response message facilitates transmitting a result of a registration as well as an MIH capability result of a correspondent node of a TCP connection, inclusive parameters of the MIH_TCP_Registration.confirm message are identical to those of the MIH_Capability_Discover.request message. Moreover, it is possible to transmit a response of the MIH capability of the correspondent node of the TCP connection using only the MIH_TCP_Registration.confirm message. Thus, an MIH_Capability_Discover.request/response exchange procedure would be unnecessary.

5. MIH_Event_Register.request

An MIH_Event_Register.request message is used by an MIH function attempting to register to a remote stack a specific event service to receive later. When it is registered that a local TCP provides an MIH with link information, the MIH_Event_Register.request message may be used in registering to a point of attachment (POA) that link status information (e.g., uplink status, loading status, etc.) the POA can obtain in the future shall be delivered to a communication correspondent of a currently connected TCP; Parameters added for this are explained as follows.

A base station receiving a registration request can provide information in two ways. First, link information may be delivered to a mobile terminal to send information to a correspondent node of a TCP connection. Second, a base station directly sends link-registered information to a correspondent node of a TCP connection with reference to a sender IP address and a correspondent node IP address in a corresponding registration request message. According to a Transmit Method among parameters, if a bit is set to 0, link information is transmitted to an entity registering an information offer request. If the bit is set to 1, it is requested that information shall be directly offered to a correspondent node of a TCP connection.

TABLE 20

| Name | Type (1 byte) | Length | Value |
|---|---|---|---|
| Sender IP Address | | Variable | (Included in case of an event registration initiated by a request of TCP), IP address of an event requesting side of ends that establish a TCP connection |
| Correspondent Node IP Address | | Variable | (Included in case of an event registration initiated by a request of TCP), IP address of an event offering correspondent node of ends that establish a TCP connection |
| Transmit Method | | 1 | Indicating a specific link information offering method<br>Bit #0: Offering information to an entity making a registration remotely<br>Bit #1: Point of attachment directly offers information to a correspondent node of TCP<br>2~7: Reserved |
| Registered Event List | | 1 | If an area of each bit is set to 1, it means that a corresponding service is remotely registered.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>Bit #6: Link Status Report<br>Bit #7: Reserved |
| Link Quality Threshold | | 1 | Reference value to receive Link Status Report established between MIH and Link according to a request made by TCP (e.g., BER, CINR, SNR, RSSI) |

TABLE 20-continued

| Name | Type (1 byte) | Length | Value |
|---|---|---|---|
| Link Status Report Period | | 1 | Unit ms (1 ms, 5 ms, 10 ms, etc, variable according to a transmit length of frame)<br>Period for reporting link quality status in case that link quality is poorer than threshold |
| TCP Type | | 1 | Indicating TCP type<br>Bit #0: Tahoe<br>Bit #1: Reno<br>Bit #2: Vegas<br>3~7: Reserved |
| Port Number | | 1 | Port Number of a currently set TCP Session |

6. MIH_Event_Register.confirm

An MIH_Event_Register.confirm message returns a result of the MIH_Event_Register.request message. The result includes a result registered to a local stack via a Link_Event_Register.request/response message.

TABLE 21

| Name | Type (1 byte) | Length | Value |
|---|---|---|---|
| Transmit Method | | 1 | Indicating a method offered for a specific link information offering method<br>Bit #0: Offering information to an entity making a registration remotely<br>Bit #1: Point of attachment directly offers information to a correspondent node of TCP<br>2~7: Reserved |
| Registered Event List | | 1 | If an area of each bit is set to 1, it means that a corresponding service is remotely registered.<br>Bit #0: Link Up<br>Bit #1: Link Down<br>Bit #2: Link Going Down<br>Bit #3: Link Detected<br>Bit #4: Link Parameters Change<br>Bit #5: Link Event Rollback<br>Bit #6: Link Status Report<br>Bit #7: Reserved |
| Link Quality Threshold | | 1 | Reference value to receive Link Status Report established between MIH and Link according to a request made by TCP (e.g., BER, CINR, SNR, RSSI) |
| Link Status Report Period | | 1 | Unit ms (1 ms, 5 ms, 10 ms, etc, variable according to a transmit length of frame)<br>Period for reporting link quality status in case that link quality is poorer than threshold |

7. MIH_TCP_Link_Status.indication

An MIH_TCP_Link_Status.indication message delivers measured link information remotely. In case that a mobile terminal is able to know both uplink information and downlink information, a Measured Link Quality Value (Downlink) and a Measured Link Quality Value (Uplink) may be included in the message. However, in case that a mobile terminal is able to know one of either uplink information or downlink information, the known information is included in the message to be delivered.

If a point of attachment (POA) performs a registration of offering link information requested by a mobile terminal (registered by MIH_Event_Register request/response and Link_Event_Register.request/response at POA), an MIH of the POA directly offers information provided by a link layer to a correspondent node in case that Transmit Method corresponds to "Point of attachment directly offers information to a correspondent node of TCP directly".

TABLE 22

| Name | Type (1 byte) | Length | Value |
|---|---|---|---|
| Measured Link Quality Value (Downlink) | | 1 | Measured link quality value (e.g., BER, CINR, SNR, RSSI) |
| Measured Link Quality Value (Uplink) | | 1 | Measured link quality value (e.g., BER, CINR, SNR, RSSI) |
| Link Event | | 1 | Generated events can be transmitted by embedding them. (Link Up, Link Down, Link Going Down, etc.) |

Figure 17:
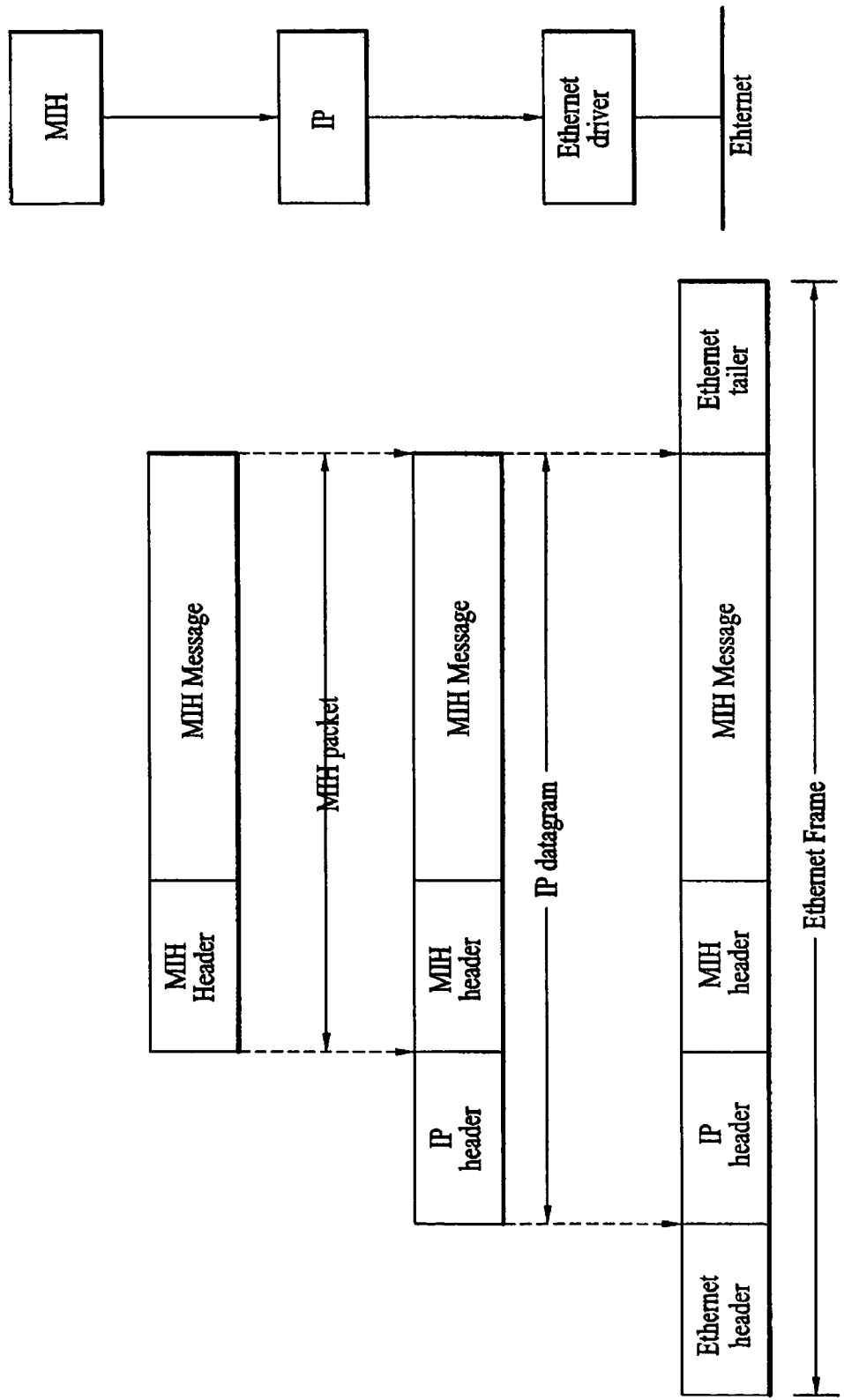
FIG. 17 is a diagram of an encapsulation method for transmitting an MIH packet using IP.

FIG. 17 is a diagram of an encapsulation method for transmitting an MIH packet using IP in accordance with one embodiment of the present invention. The present invention is applicable to a wireless communication system operating at least one communication network such as an Ethernet, a wireless LAN, a wireless MAN (Metropolitan Area Network), a 3GPP network, a 3GPP2 network, a wireless PAN (Personal Area Network), and the like.

In the following embodiments of the present invention, methods for detection, registration and TCP control between a mobile terminal supporting media independent handover (MIH) a correspondent node are explained. As mentioned in the foregoing description, the detection, registration and TCP control methods in various communication networks are applicable and no limitation is put on a type thereof. Furthermore, in the following embodiment, no limitation is put on which one of a TCP server and a client initially configures a connection.

Although a point of attachment (POA) is represented as part of an IEEE 802.11 or IEEE 802.3 system, it can be replaced by various other communication networks. Moreover, it is apparent to those skilled in the art that a method for reporting a channel status of a link layer according to the present invention may be carried out according to the application of the various communication networks.

A TCP control method is explained according to a link status variation in handover in the following description of one embodiment of the present invention. Although an old point of attachment, a new point of attachment and a second point of attachment are represented as part of an IEEE 802.11 system, IEEE 802.16 system and IEEE 802.3 system, respectively, they are just exemplary for one preferred embodiment of the present invention. As mentioned in the foregoing description, the present invention is applicable to various communication networks.

Figure 18:
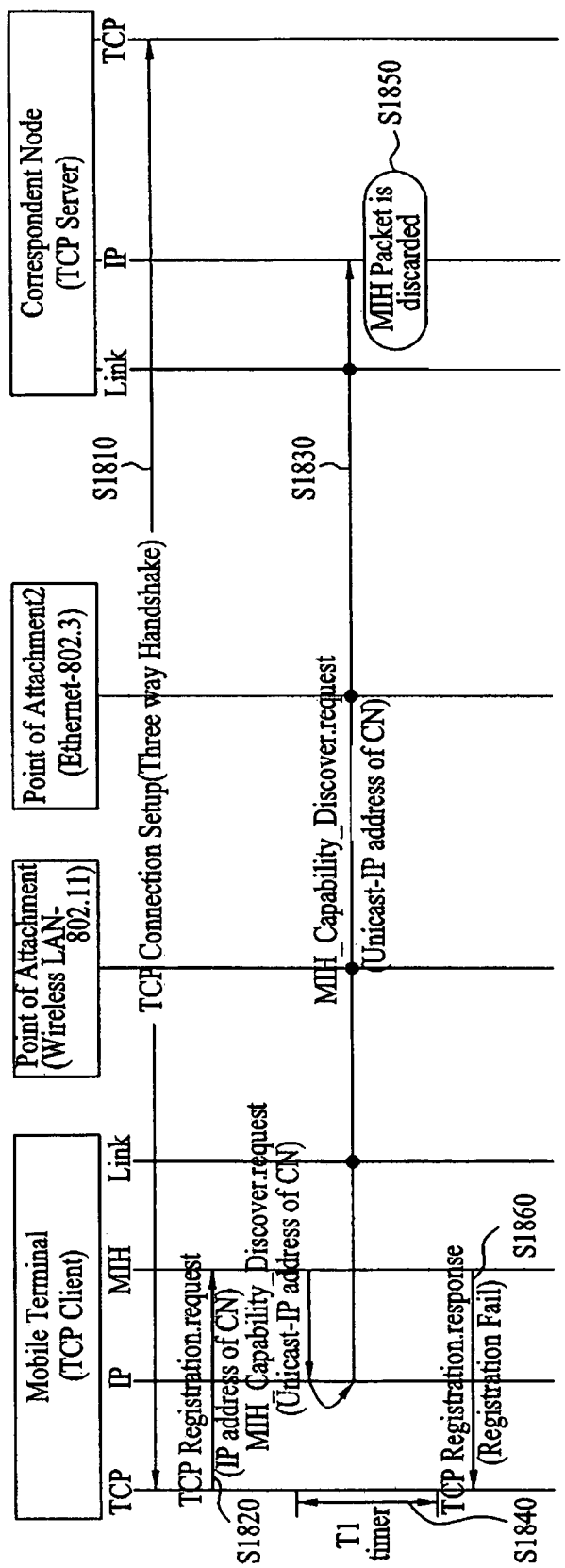
FIG. 18 is a flowchart of a method for detecting whether an MIH function is supported by a correspondent node according to a request of a transmission control protocol (TCP) of a mobile terminal in accordance with one embodiment of the present invention.

FIG. 18 illustrates a local/remote registration procedure necessary for using local link information after configuring a TCP connection and information of a correspondent node of the TCP connection. FIG. 18 further illustrates a series of procedures performed by transmitting a TCP_Registration.request primitive that requests to initiate an MIH function support discovery procedure of the correspondent node and a registration procedure to the correspondent node.

A server and client of the TCP configure a connection mutually (S1810). Because the server and the client of the TCP are decided according to which one initially makes a connection configuration, the client and server represented in the present procedure may be reciprocally replaced. After completing the TCP connection configuration, the TCP transmits a registration message (TCP Registration.request) to an MIH function within its local stack (S1820). Preferably, the registration message requests to deliver an event in the future and to discover whether a correspondent node supports an MIH function.

The MIH function within the local stack then transmits an MIH_Capability_discover.request message to a correspondent IP address included in a TCP_Registration.request primitive to perform a procedure for discovering whether a correspondent node having a currently configured TCP connection supports an MIH function (S1830). Simultaneously, the MIH function with the local stack activates a timer for indicating whether the correspondent node does not support an MIH function if no response is received from the correspondent node within a predetermined time (S1840).

As shown in FIG. 18, the correspondent node having received the MIH_Capability_Discover.request message is unable to respond because it is unable to further deliver the MIH_Capability_Discover.request due to absence of the MIH function in its own stack. Accordingly, the MIH message is discarded (S1850).

In the present embodiment, MIH capability of a remote node is discovered by a TCP_Registration.request primitive. However, the TCP_Registration.request primitive may be used for requesting link information from a local MIH function. A link event registration procedure may then be executed with a link layer and a corresponding result is transmitted via a TCP_Registration.response primitive.

In order for a congestion control scheme of the TCP to operate, wherein packet error due to a poor link channel and congestion may be identified, the TCP needs to know both its own uplink/downlink link status and a remote uplink/downlink link status. Preferably, for a received packet, the TCP should know its own downlink status and an uplink status of a correspondent node. For a transmitted packet, the TCP should inform a correspondent node of the TCP's uplink status and the correspondent node should know the correspondent node's downlink status.

Figure 19:
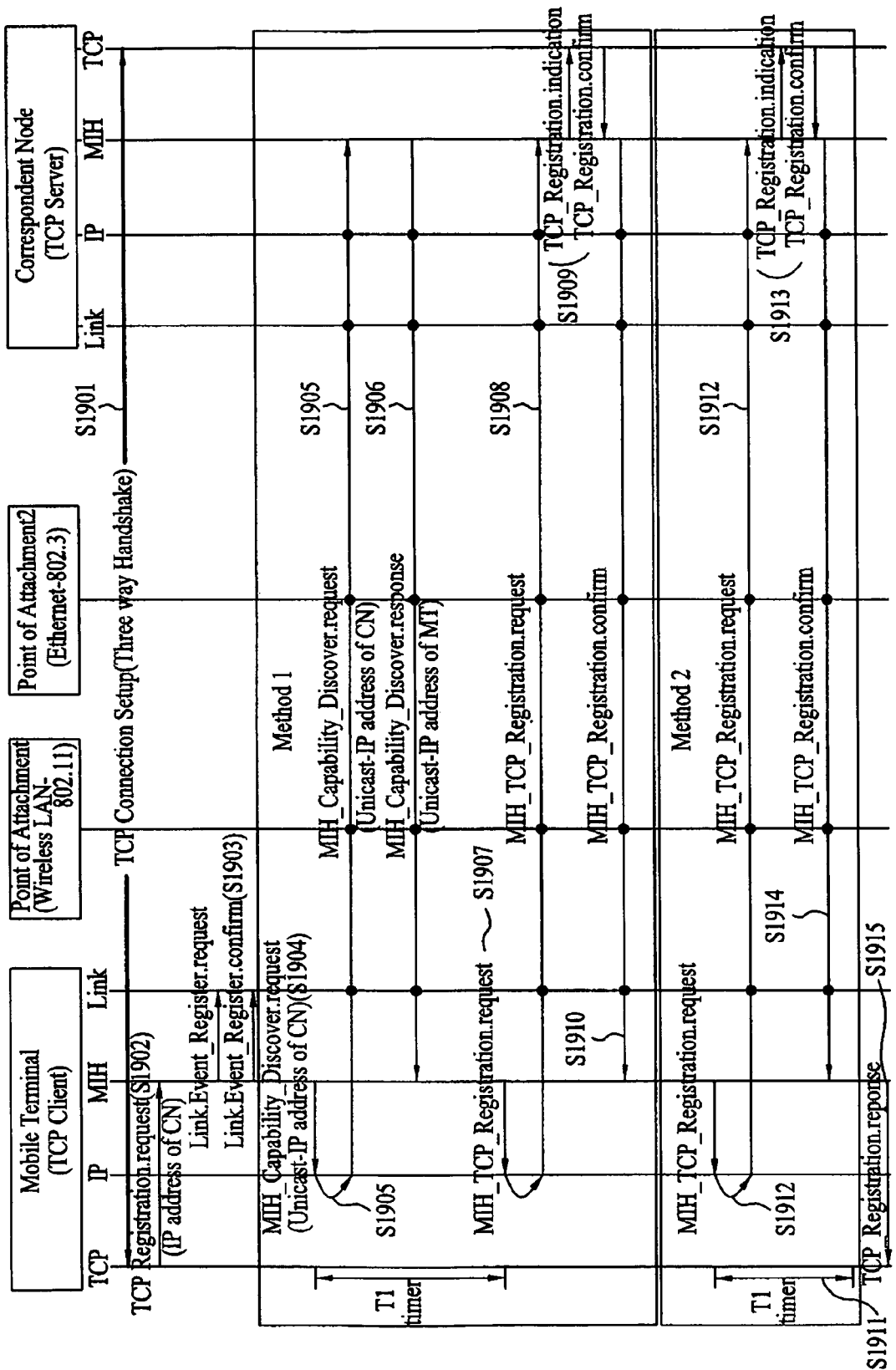
FIG. 19 is a flowchart of a method for detecting whether an MIH function is supported by a correspondent node according to a request of a TCP of a mobile terminal in accordance with one embodiment of the present invention.

FIG. 19 illustrates a registration procedure for enabling an enhanced congestion control scheme of the TCP wherein link statuses are indicated from a local TCP or remote TCP. In accordance with one embodiment of the present invention, a mobile terminal is able to know both uplink and downlink statuses.

A server and client of the TCP configure a connection mutually (S1901). After completing the TCP connection configuration, the TCP transmits a registration message to an MIH function within a local stack (S1902). Preferably, the registration message requests to deliver an event presently and to discover whether a correspondent node supports an MIH function.

The MIH function of the local stack performs a registration procedure with a local link to receive information of the local link (S1903). Through this registration procedure, the MIH function can set a threshold of a link quality. The threshold may be a reference of report, a report period, and the like in a link layer.

Preferably, there are two kinds of methods for discovering and registering MIH capability of a correspondent node. In accordance with the present invention, a second method (Method 2) differs from a first method (Method 1) in that both MIH function search and registration are carried out together via an MIH_TCP_Registration.request/response message. In accordance with one embodiment of the present invention, Method 1 uses an MIH_Capability_Discover.request/response message for the MIH function search. However, both the search and registration procedures can be performed according to inclusive parameters. In this case, the MIH_Capability_Discover.request/response message may be used in the same procedure of Method 2.

Method 1 is explained as follows. To perform a procedure for discovering whether a correspondent node having a current TCP connection configuration supports an MIH function, a local MIH function transmits an MIH_Capability_Discover.request message to a correspondent IP address included in a TCP_Registration.request primitive (S1904). The MIH_Capability_Discover.request message can be delivered in an IP packet format that is delivered to the correspondent node via a network (S1905).

If the MIH function exists in the correspondent node, the MIH function of the correspondent node can receive the MIH_Capability_Discover.request message and transmits a corresponding response to a source address contained in the received message (S1906). The local MIH function having discovered that the correspondent node supports an MIH function transmits an MIH_TCP_Registration.request message via an IP layer to perform a registration procedure (S1907). The MIH_TCP_Registration.request message is delivered to the correspondent node via an IP network (S1908).

An MIH of the correspondent node having received the registration request makes a registration request to a corresponding TCP with reference to a port number of a TCP session of the delivered message (S1909). Accordingly, this enables the TCP of the correspondent node to perform an enhanced TCP congestion control scheme using the link information to be offered in the future. Afterward, an MIH_TCP_Registration.confirm message containing a registration result of the correspondent node with the TCP is transmitted to the mobile terminal (S1910).

Method 2 is explained as follows. To perform a procedure for discovering whether a correspondent node having a current TCP connection configuration supports an MIH function and a registration procedure, the MIH transmits an MIH_TCP_Regisration.request message to a correspondent IP address included in a TCP_Registration.request primitive and activates a timer to be used in case the MIH function search fails (S1911).

The MIH_TCP_Regisration.request is delivered to the correspondent node via a network (S1912). The MIH of the correspondent node having received the registration request makes a registration request to a corresponding TCP with reference to a port number of a TCP session of the delivered message (S1913). Accordingly, this enables the TCP of the correspondent node to perform an enhanced TCP congestion control scheme using the link information to be offered in the future. Afterward, an MIH_TCP_Registration.confirm message containing a registration result of the correspondent node with the TCP is transmitted to the mobile terminal (S1914). The local MIH function then informs the TCP of the local registration result, the remote MIH function search result and the registration result (S1915).

FIG. 20 illustrates a registration procedure for offering uplink link status information a point of attachment can learn. Preferably, the registration procedure is made to the point of attachment because a downlink link status received by a mobile terminal is known only. A remote registration procedure to a correspondent node is shown as well.

In making a remote registration to a point of attachment, the corresponding registration can be made by delivering link information to a mobile terminal to enable the mobile terminal to use the information in the future. Alternatively, the registration can be made by a point of attachment directly providing information to a correspondent node.

In accordance with one embodiment of the present invention, steps shown in FIG. 20 are similar to those of the embodiment shown in FIG. 19 (Method 2) except for the steps S1904 to S1906. Accordingly, the differences are explained as follows.

An MIH function having received a registration request from a TCP makes a remote event registration request to a point of attachment to use uplink information the point of attachment knows (S2004). An MIH function of the point of attachment receives the remote event registration request and performs a registration procedure for receiving information from a link layer of the point of attachment (S2005). Afterward, a mobile terminal is informed of a registration result comprising a result an event registration procedure with the link layer (S2006).

In this remote registration process, the mobile terminal can negotiate two methods that the point of attachment offers the information of uplink. A first method is carried out in a manner that the point of attachment reports the uplink information to the mobile terminal and that the mobile terminal provides the reported information to a correspondent node. A second method is carried out in a manner that the point of attachment directly provides the uplink information to the correspondent node. A request for the negotiation is included in an MIH_Event_Regiser.request message (S2004) and a possibility result of the point of attachment is included in an MIH_Event_register.confirm message (S2006).

Figure 21:
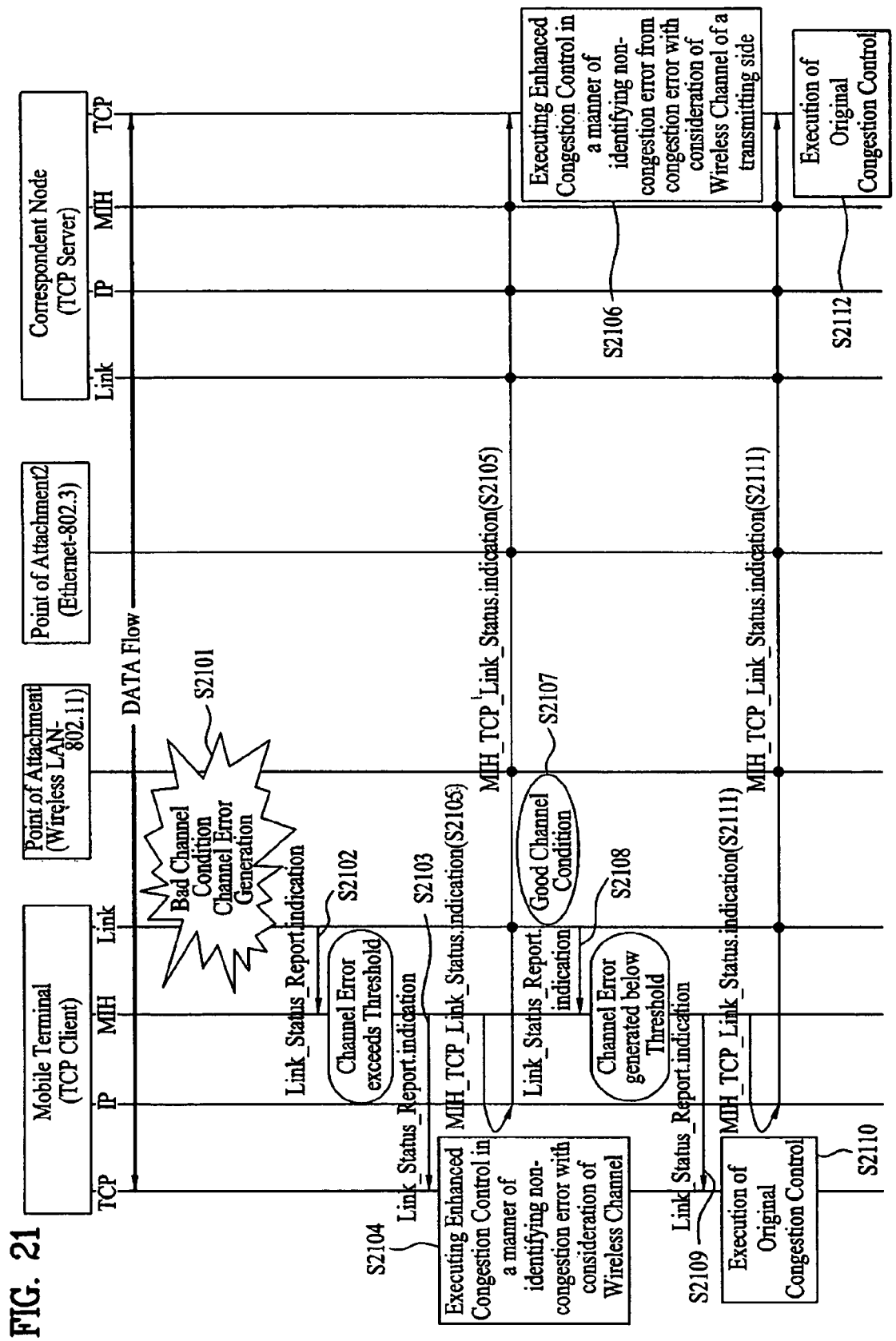
FIG. 21 is a flowchart of a method for controlling congestion of a TCP in accordance with a link channel status in accordance with one embodiment of the present invention.

FIG. 21 illustrates that each TCP can use an enhanced congestion control method in a manner of informing a local TCP and a correspondent node TCP of information according to a status variation of a radio link after completing the above-described registration procedure. In accordance with one embodiment of the present invention, a mobile terminal is able to know both uplink and downlink statuses.

As shown in FIG. 21, a status of a radio link connecting a mobile terminal and a point of attachment together is shifted to a bad channel status (S2101). A link layer of the mobile terminal then reports the bad link channel status to an MIH function. Preferably, the corresponding report can be made by the link layer if a threshold set by a registration procedure with the link layer is exceeded, or when a timer expires at the end of a report period, for example. Alternatively, the corresponding report can be reported periodically by the link layer (S2102).

The MIH function refers to a set reference value (threshold). If the reference value is exceeded, the MIH function reports a measured value of the link status to a TCP (S2103). If an error for a currently received packet is generated, the TCP having received the measured value detects that the error is attributed not to congestion but to the radio link. The TCP then uses an enhanced congestion control method (S2104).

The MIH function notifies radio channel information to a correspondent node in a remotely registered TCP session as well as its local stack. The report made from the MIH function in the bad radio situation continues to be made according to a period set by the aforesaid registration procedure (S2105). Preferably, the steps S2103 and S2105 are simultaneously executed at a time of making the report when the radio channel status exceeds the threshold.

The correspondent node in the TCP session having received the remote radio channel status recognizes that the currently generated packet error is attributed not to congestion but to the radio link situation. Accordingly, the correspondent node uses an enhanced congestion control method (S2106).

After a predetermined time passes, the channel status is enhanced (S2107). The link layer then reports a condition of the channel to the MIH function (S2108). If the reported value goes below the threshold, the MIH function reports the value to the TCP (S2109). Having received the reported value, the TCP recognizes that the radio link status is enhanced, and uses an original TCP congestion control method accordingly (S2110).

The MIH function also notifies the radio channel information to the correspondent node in the remotely registered TCP session (S211). Preferably, the steps S2109 and S2111 are simultaneously executed. The correspondent node in the TCP session having received the remote radio channel status recognizes that the radio link status is enhanced and uses the original TCP congestion control method (S2112).

Figure 22:
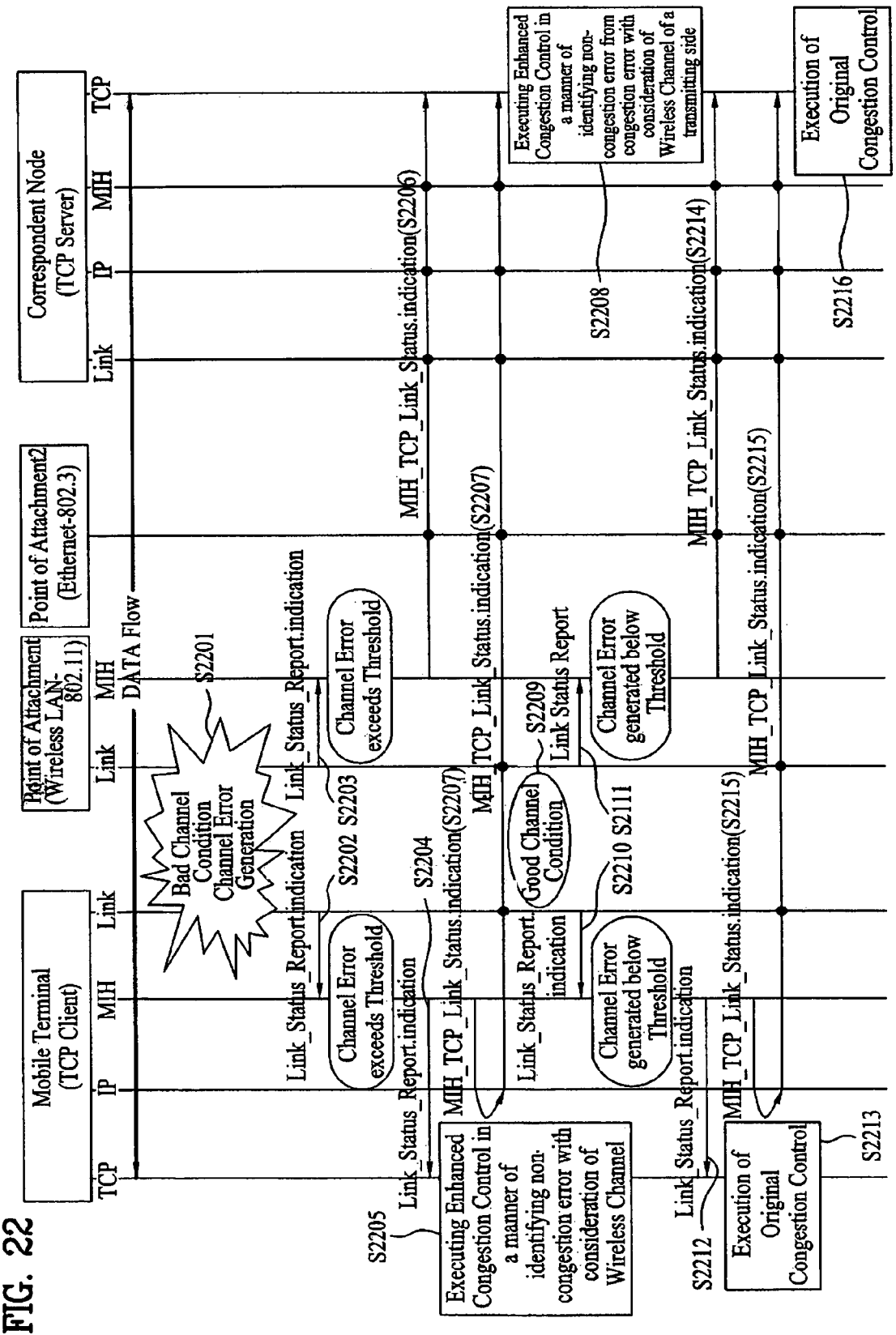
FIG. 22 is a flowchart of a method for controlling congestion of a TCP in accordance with a link channel status in accordance with one embodiment of the present invention.

FIG. 22 illustrates radio uplink information being delivered to a correspondent node in a TCP session by a point of attachment in accordance with one embodiment of the present invention. The embodiment shown in FIG. 22 is similar to the embodiment shown in FIG. 21 except for the procedures for acquiring uplink information from a point of attachment and delivering it to a correspondent node. The differences are explained as follows.

The present embodiment corresponds to a case that the link associated information offer described in FIG. 20 is registered to a point of attachment remotely and that the point of attachment directly requests a correspondent node to provide information.

As shown in FIG. 22, a link layer of a point of attachment discovers that a quality of a radio uplink is degraded and reports the link quality to an MIH function (S2203). If a threshold set in a registration procedure is exceeded, the point of attachment remotely transmits channel error information to an MIH function of a correspondent node in a TCP session (S2206).

A TCP of the correspondent node then recognizes that a currently generated error of a TCP packet is attributed not to congestion but to a status of a radio link using values delivered from the mobile terminal. Accordingly, the point of attachment uses an enhanced congestion control method (S2208).

Afterward, the link layer of the point of attachment detects that the uplink status is enhanced and notifies the MIH function of the point of attachment (S2211). If a notified value goes below the threshold set in the registration procedure, the point of attachment remotely transmits the value to the MIH of the correspondent node in the TCP session (S2214). The TCP of the correspondent node then decides that the status of the radio link is enhanced using the values delivered from the mobile terminal, and uses an original congestion control method (S2216).

Figure 23:
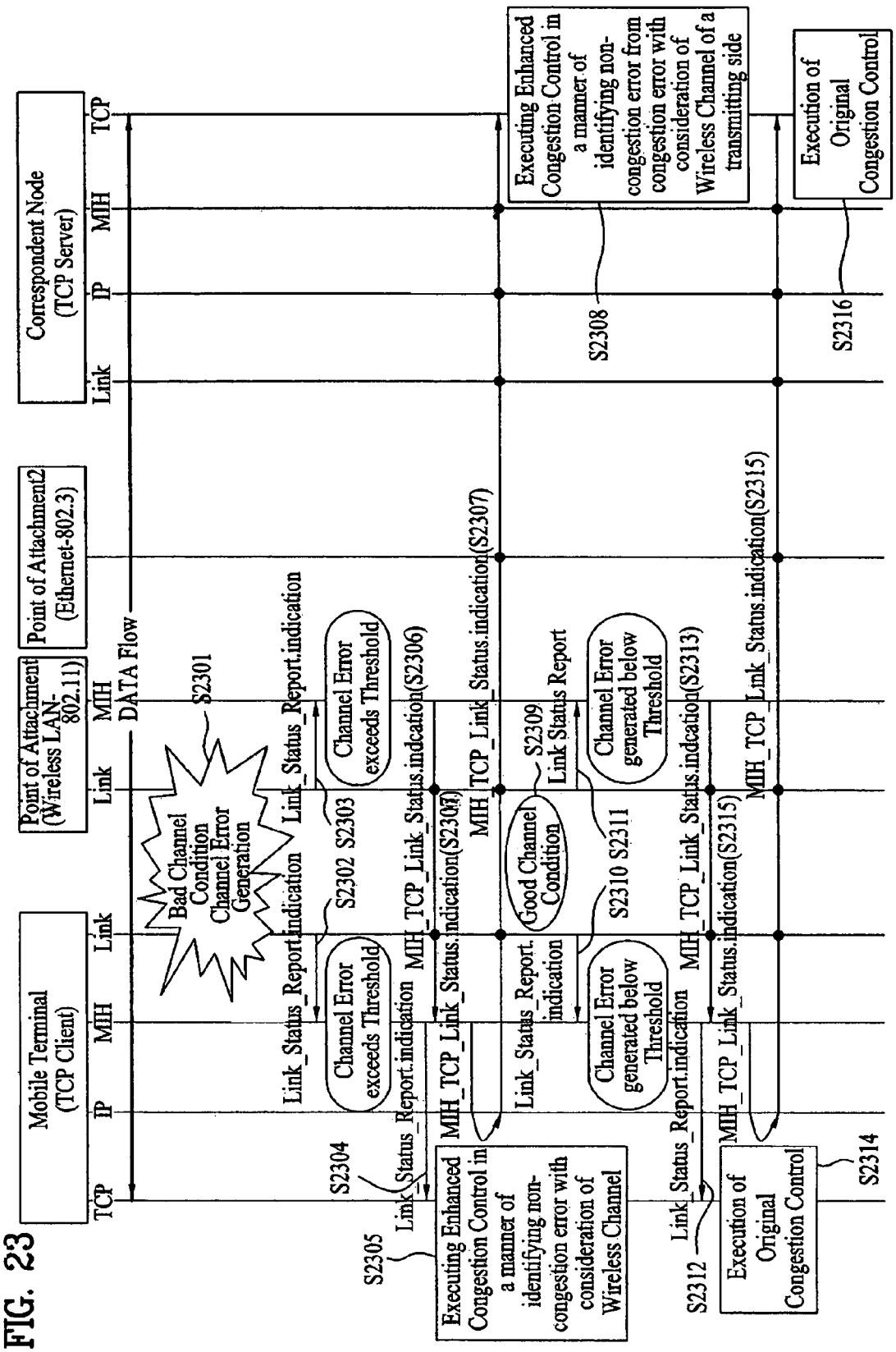
FIG. 23 is a flowchart of a method for controlling congestion of a TCP in accordance with a link channel status in accordance with one embodiment of the present invention.

FIG. 23 illustrates a point of attachment providing a mobile terminal with detectable radio uplink information, wherein the mobile terminal delivers the uplink information to a correspondent node in a TCP session together with downlink information obtained by the mobile terminal. The embodiment shown in FIG. 21 is similar to the embodiment shown in FIG. 21 except for a procedure for informing a mobile terminal of information acquired by a point of attachment. The differences are explained only as follows. The present embodiment corresponds to a case wherein the link associated information offer described in FIG. 20 is remotely registered to a point of attachment, wherein it is requested that the uplink information acquired by the point of attachment be provided to a mobile terminal.

In accordance with one embodiment of the present invention, a link layer of a point of attachment discovers that a quality of a radio uplink is degraded and reports the link quality to an MIH function (S2303). If a threshold set in a registration procedure is exceeded, the point of attachment remotely transmits the link quality to an MIH function of a mobile terminal in a TCP session (S2306). The MIH function of the mobile terminal then delivers uplink and downlink status information to a TCP via an MIH function of the correspondent node (S2307).

The correspondent node recognizes that a currently generated error of a TCP packet is attributed not to congestion but to a status of a radio link with the value delivered from the mobile terminal. Accordingly, the correspondent node uses an enhanced congestion control method (S2308). Afterward, the link layer of the point of attachment detects that the uplink status is enhanced and notifies the MIH function of the point of attachment (S2311).

If the notified value goes below the threshold set in the registration procedure, the point of attachment remotely transmits the value to the MIH function of the mobile terminal (S2313). The MIH function of the mobile terminal then delivers the uplink and downlink status information to the TCP via the MIH function of the correspondent node (S2315). Subsequently, the TCP of the correspondent node decides that the status of the radio link is enhanced with the value delivered from the mobile terminal and uses an original congestion control method (S2316).

Figure 24:
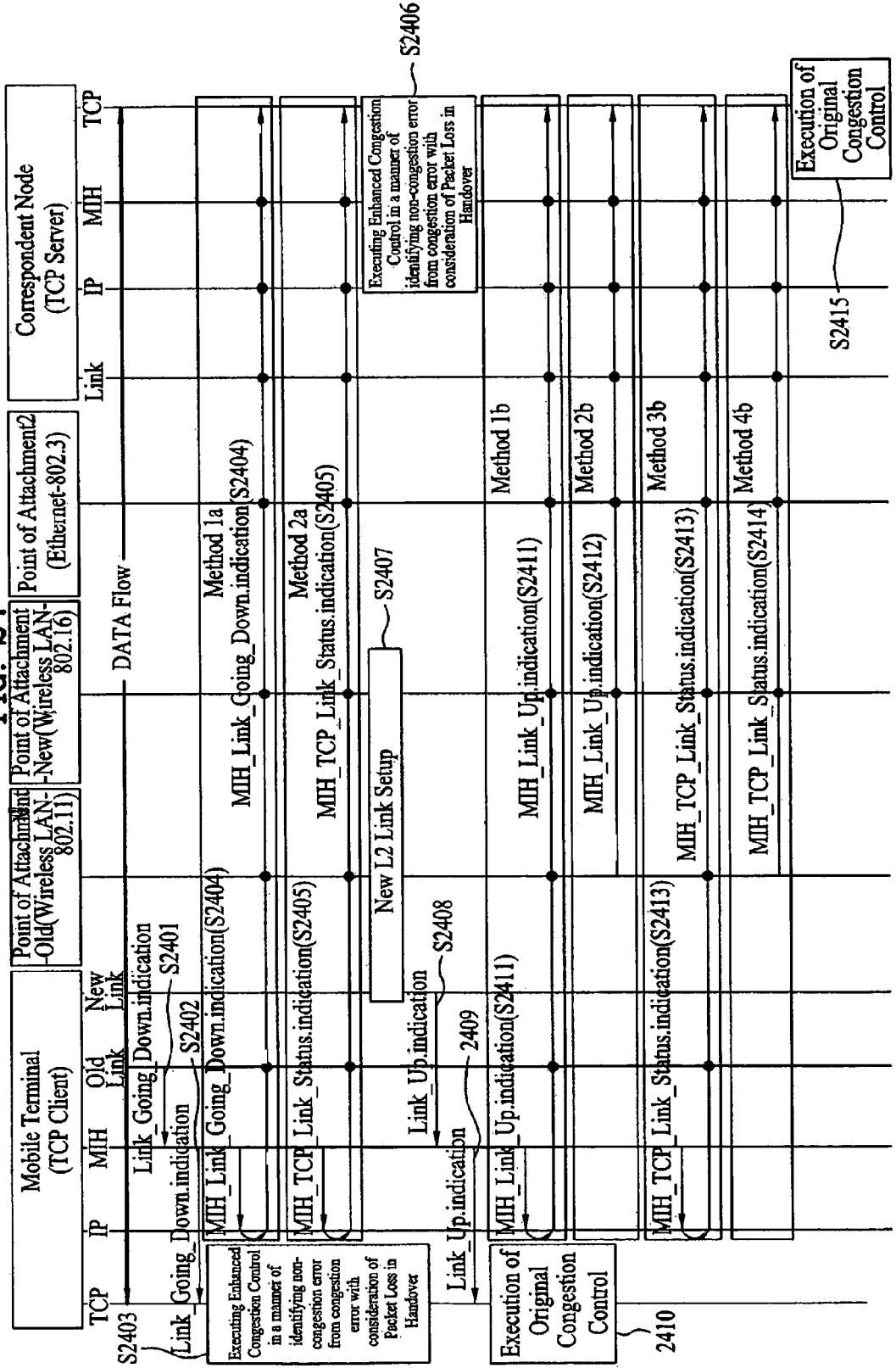
FIG. 24 is a flowchart of a method for controlling congestion of TCP in accordance with a link channel status dependent on handover in accordance with one embodiment of the present invention.

FIG. 24 illustrates an embodiment wherein a TCP is able to use an enhanced congestion control method by informing the TCP of a radio link error that can be generated in handover by identifying the radio link error from a normal congestion error.

In accordance with one embodiment of the present invention, information indicating that a currently connected link will go down after a predetermined duration according to a movement of a mobile terminal and the like is delivered to an MIH function. This information can be utilized as information for indicating that handover can be initiated and that a status of a current radio link is bad (S2401).

The MIH function then notifies a local TCP of the information indicating that the radio link will soon be disconnected (S2402). The local TCP having received the information knows that a radio channel status is bad and is on the verge of a handover situation. Accordingly, the local TCP uses an enhanced congestion control method (S2403). The information is also notified to a correspondent node in a TCP session (S2404), which is simultaneously executed together with the procedure of step S2402.

In one aspect of the invention, an alternative method for delivering an event of the radio link to the correspondent node of the TCP is a method for delivering the event by loading link event information (Link_Going_Down) or radio link status information in a message indicating a link status remotely (S2405).

The correspondent node having received the link status (Link Going Down or link measuring value) remotely recognizes that a currently generated TCP packet error is attributed to the handover and uses an enhanced congestion control method (S2406). Afterward, the mobile terminal establishes a new link (S2407). The link establishment is then notified to an MIH function (S2408), which delivers the information to the TCP (S2409). The TCP then recognizes that the handover is completed due to the establishment of the new link and uses an original congestion control method (S2410).

In a further aspect of the invention, there are four ways for delivering the information indicating that the link is established to the correspondent node in the TCP session. Firs, the MIH function of the mobile terminal delivers Link Up information to the correspondent node (S2411). Second, the point of attachment uses an MIH message remotely indicating Link_Up (S2412). Third, the mobile terminal embeds this information in a message indicating a link status (S2413). Fourth, the point of attachment embeds Link Up information in a message indicating a link status (S2414). The TCP of the remote correspondent node then recognizes that the handover is completed with the delivered information and uses an original congestion control method (S2415).

Accordingly, in a link status reporting method using an MIH function according to the present invention, both end-to-end terminals mutually exchange information for an event generated on a link between MIH functions. The information is then delivered to the TCP. Therefore, packet loss attributed to congestion can be explicitly identified from non-congestion packet loss attributed to a radio section, handover or the like. Hence, an enhanced congestion control method can be used in a manner that the TCP identifies whether the TCP packet error corresponds to congestion packet loss or non-congestion packet loss.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for controlling packet errors in a wireless communication system, the method comprising:
    receiving, at a media independent handover (MIH) module of a mobile terminal, a first message indicating that a link with a current point of attachment is going down;
    transmitting, at the MIH module of the mobile terminal to a transmission control protocol (TCP) entity of the mobile terminal, first information in response to the first message, the first information indicating that the link with the current point of attachment is to be released;
    transmitting, at the TCP entity of the mobile terminal to a TCP entity of a correspondent remote node, a first link status indication message after receipt of the first message, the first link status indication message embedding link going down information;
    establishing a layer 2 (L2) link with a new point of attachment for a handover during which a first congestion control scheme is executed by the TCP entity of the correspondent remote node in response to the link going down information of the first link status indication message in a manner of identifying radio link error from congestion error in consideration of packet loss in handover;
    transmitting, at the TCP entity of the mobile terminal to the TCP entity of the correspondent remote node, a second link status indication message when the L2 link with the new point of attachment is established, the second link status indication message embedding link up information; and
    executing, at the TCP entity of the correspondent remote node, a second congestion control scheme different from the first congestion control scheme in response to the link up information of the second link status indication.

* * * * *